US007403948B2

(12) United States Patent
Ghoneimy et al.

(10) Patent No.: US 7,403,948 B2
(45) Date of Patent: Jul. 22, 2008

(54) WORKFLOW SYSTEM AND METHOD

(75) Inventors: Adel Ghoneimy, Hillsborough, CA (US); Ali Zinatbaksh, San Jose, CA (US); Sandeep Tiwari, Los Gatos, CA (US); Jerry D. Wein, San Jose, CA (US); Andrew Jun, San Jose, CA (US); Ruby S. Simhadri, San Jose, CA (US)

(73) Assignee: Fujitsu Limited (JP)

( * ) Notice: Subject to any disclaimer, the term of this patent is extended or adjusted under 35 U.S.C. 154(b) by 472 days.

(21) Appl. No.: 10/438,698

(22) Filed: May 14, 2003

(65) Prior Publication Data

US 2004/0078373 A1 Apr. 22, 2004

Related U.S. Application Data

(63) Continuation of application No. 09/763,645, filed as application No. PCT/US99/19232 on Aug. 24, 1999, now abandoned.

(60) Provisional application No. 60/097,879, filed on Aug. 25, 1998, provisional application No. 60/097,791, filed on Aug. 25, 1998, provisional application No. 60/097,583, filed on Aug. 24, 1998.

(51) Int. Cl.
*G06F 7/00* (2006.01)
*G06F 17/30* (2006.01)

(52) U.S. Cl. .............................. 707/10; 707/9

(58) Field of Classification Search .................. 707/9, 707/10; 715/536, 764, 853; 705/9
See application file for complete search history.

(56) References Cited

U.S. PATENT DOCUMENTS

| 5,721,913 | A | 2/1998 | Ackroff et al. |
| 5,826,239 | A | 10/1998 | Du et al. |
| 6,049,799 | A * | 4/2000 | Mangat et al. ............... 707/10 |
| 6,208,345 | B1 * | 3/2001 | Sheard et al. .............. 715/853 |
| 6,430,538 | B1 * | 8/2002 | Bacon et al. ................. 705/9 |
| 6,526,426 | B1 * | 2/2003 | Lakritz ...................... 715/536 |
| 6,621,505 | B1 * | 9/2003 | Beauchamp et al. ........ 715/764 |

* cited by examiner

*Primary Examiner*—Apu Mofiz
*Assistant Examiner*—Chelcie Daye
(74) *Attorney, Agent, or Firm*—Christie, Parker & Hale, LLP.

(57) ABSTRACT

A workflow system that automates work processes. The workflow system uses an open architecture to support multiple platforms and includes Application Programming Interfaces (APIs) enabling applications to communicate with a workflow engine. The workflow system supports Relational DataBase Management System (RDBMS) databases and allows routing of any kind of work (forms, images, executables). In addition, its flexible architecture is designed to facilitate changes to a workflow dynamically and to support integration with an existing infrastructure.

The workflow system links software components to enable participants to work on shared data and ensures that business processes follows predetermined rules. Each task in the process is regulated such that the appropriate people have access to the appropriate data and are instructed to perform the task at the appropriate time.

A developer can use a workflow system provided client to get an application up and running relatively quickly. The workflow system provides adapters which enables quick deployment and element flexibility. Adapters have a fixed interface which allows the Document Management System ((DMS)), Directory Services (DS) and DataBase system (DB) to be changed independent of the application in contrast to other workflow systems which tie the application directly to the (DMS), DS, and DB. The adapters allow developers to attach clients of varying types and magnitude and allows developers to mix and match application elements to better serve their application. Thus, the workflow system is not tied to any proprietary (DMS), DS, or DB.

43 Claims, 15 Drawing Sheets

CLICK TO SEE THE MEMBERS OF A ROLE OR MODIFY THE ROLE

ROLE WHOM THE ACTIVITY IS ASSIGNED TO

NAME OF THE ACTIVITY

CLICK TO DISPLAY GENERAL ATTRIBUTES OF THE ACTIVITY

CLICK TO SEE THE FORMS WHICH ARE ASSOCIATED WITH THIS ACTIVITY

START — CONDITIOAL — OR

ACTIVITY — EXIT — AND — ARROW

WORKFLOW SYSTEM AND METHOD

CROSS REFERENCE TO RELATED APPLICATIONS

This application is a continuation of U.S. patent application Ser. No. 09/763,645, filed Feb. 23, 2001 now abandoned, which is a National Phase Patent Application of International Application Number PCT/US99/19232, filed on Aug. 24, 1999, which claims the benefit of the U.S. Provisional applications 60/097,583 filed Aug. 24, 1998; U.S. Provisional patent application 60/097,879 filed Aug. 25, 1998; and U.S. Provisional Application No. 60/097,791 filed Aug. 25, 1998, and are hereby incorporated by reference as if fully set forth herein:

U.S. Pat. No. 5,490,097, Swenson et al., entitled, "SYSTEM AND METHOD FOR MODELING, ANALYZING AND EXECUTING WORK PROCESS PLANS, issued Feb. 6, 1996 is hereby incorporated by reference for all purposes as if fully set forth herein.

FIELD OF THE INVENTION

The present invention relates generally to an open workflow architecture, and more particularly to a workflow system which automates work processes.

BACKGROUND OF THE INVENTION

A major concern of businesses or any other group of people working together on a joint project is the efficient achievement of the goal of the project. In achieving this goal, many different tasks are performed by a variety of individuals within the group. Many of these tasks may only be performed after one or more other tasks are completed. Further, there is usually much communication between individuals or groups in the course of completing a task or in connection with indicating that a task has been completed. The various tasks necessary to complete the overall project or achieve an overall goal and the overall interrelationship between these tasks are called a work process.

Change is a common occurrence with automated process solutions, particularly because processes involve people. Developing anything beyond a simple automated process solution using traditional workflow products can prove to be a most challenging task for even the most experienced automation expert. Long and complicated development cycles are commonplace with complex automated solutions, and once created, can be extremely difficult to modify as the process evolves.

Current workflow technologies with their proprietary systems and dated architecture are no longer suitable to accommodate the changes in people, procedures, and resources that comprise a typical business process. Moreover, most existing workflow products cannot keep pace with the speed at which technology advances. The Internet, Information Technology (IT) infrastructures, and supporting workflow-related applications continuously evolve, enabling process automation to make giant strides, but only if the workflow application can accommodate these advances. Consequently, analysts and developers need a workflow solution that can change faster and more easily than a process can evolve, while harnessing the power of technological advancements.

Workflow is a relatively new concept which evolved out of an effort to automate business processes by developing specialized applications which incorporated the logic for the flow of work for a given process. The shortcoming of this approach is that any time a process changes, the entire application has to be updated resulting in a maintenance nightmare. Workflow was introduced to address this problem by encapsulating all aspects of a process. This includes process-defining information such as rules, routing paths, activities, data, etc. More importantly, it includes the automation of the management of this information. An application which supports workflow could then implement any workflow without requiring intimate knowledge of the workflow process itself.

Workflow systems were created to automate work processes. The history of workflow solutions has taken two general paths: (1) primitive framework, and (2) complete solutions with many limitations. The primitive framework approach provided a minimal skeleton, that is, code which was common to workflow systems, but not suited to any particular system. The primitive framework was difficult to deploy because it required creating a large amount of code to get the workflow system running for any particular application. On the other hand, the complete-solution-with-many-limitations approach included a large amount of code geared towards solving a particular application. However, the complete-solution approach did not apply to a variety of applications. A complete-solution workflow system was geared towards a particular Document Management System ((DMS)), Directory Services (DS) and DataBase system (DE). If any element of the workflow system was changed, a reworking of the workflow system was required. Consequently, continual maintenance was required whenever there was a change in a workflow element (including updates to a workflow element). For example, if a the (DMS) was changed to another (DMS), it required code changes in the workflow system. Thus, the complete-solution approach was inflexible and not readily adaptable to changes to applications.

SUMMARY OF THE INVENTION

The invention is a workflow system that automates work processes. A desired result of the invention is relatively easy deployment and enhanced flexibility. The workflow system uses a variety of clients and adapters. A developer can use a workflow system provided client to get an application up and running relatively quickly. The workflow system provides adapters which enables quick (DMS), (DS), and (DB) deployment and element flexibility. Adapters have a fixed interface which allows the (DMS), (DS), and (DB) to be changed independent of the application in contrast to other workflow systems which tie the application directly to the (DMS), (DS), and (DB). The adapters allows developers to attach clients of varying types and magnitude and allows developers to mix and match application elements to better serve their application. Thus, the workflow system is not tied to any proprietary (DMS), (DS), or (DB) because the (DMS), (DS), and (DB) do not have to be from the same vendor.

There are two industry-accepted types of workflow products: Ad Hoc and Production. Ad Hoc workflow is designed as an unstructured, free-form workflow which puts few, if any, constraints on the process. It may link software components such as a word processor, spreadsheet program, and electronic mail program/system to enable participants to work on shared data. This type of workflow is useful for business functions such as sharing ideas, reviewing documents, and processing requests for approval. Production workflow strives to ensure that a business process follows predetermined rules. That is, each task in the process is regulated such that the appropriate people have access to the appropriate data and are instructed to perform the task at the appropriate time.

This type of workflow is useful for business functions in which it is important to follow set rules and which are apt to be performed in real-time. Examples include sales, purchasing, manufacturing, and accounting.

The workflow system uses an open architecture to support both these types of workflow. It supports multiple platforms and includes Application Programming Interfaces (APIs) which enable applications to speak to the workflow engine, supports Relational DataBase Management System (RDBMS) databases, and allows routing of any kind of work (forms, images, executables). In addition, its flexible architecture is designed to facilitate changes to a workflow dynamically and to support integration with an existing infrastructure.

DETAILED DESCRIPTION

Figure 1:
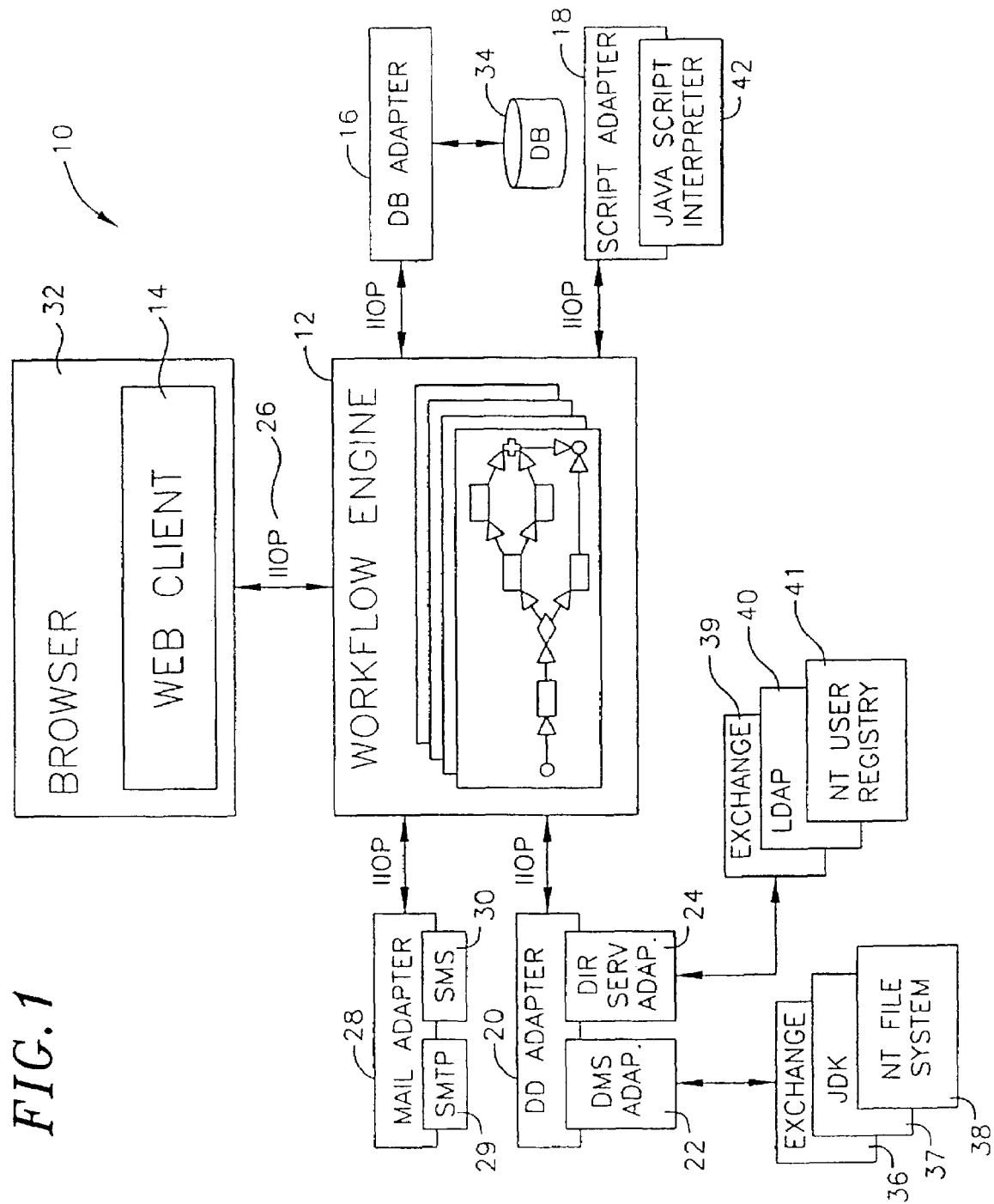
FIG. 1 shows the overall distributed workflow system components architecture and component interaction of an embodiment of the invention.

FIG. 1 shows the overall distributed workflow system components architecture and component interaction of an embodiment of the invention. The workflow system 10 is a distributed client-server, web-enabled workflow system/model. In addition, the workflow system is an application development tool for automating collaborative processes and administrative intercompany processes. The workflow system provides a workflow development environment complete with the framework, tools and components necessary to create customized workflow solutions that integrate seamlessly with existing IT infrastructures. For the deployment of these solutions, the workflow system provides a uniform and scalable support infrastructure within the enterprise through a web-based interface. Unlike other workflow solutions which are window-based, the workflow system is web-based which means that the workflow system is accessible from a web browser. Some key features of the workflow system include: Enterprise-wide, scalable infrastructure for handling processes of all types; ability to easily create and modify visual business process models beforehand or on-the-fly (no programming required); feature-rich graphical display for quick assessment of process status and understanding of the big picture; organizable and filterable universal to-do list; immediate notification of assignments; integration with a document management system to centralize the location for documents relevant to a process; accessibility from Web browsers; and Application Programming Interface (API) which allows a developer to create a customized application which communicates with the workflow engine or existing products to be workflow-enabled.

The workflow system provides a workflow management framework which empowers business groups to collaboratively plan, automate, track, and improve business processes. The workflow system is not only a model of the workflow, but is a development environment/tool for developing the workflow system/model. The workflow system empowers the end user in developing and manipulating workflow processes. It allows the knowledge worker to define sufficiently meaningful workflow processes without any knowledge of programming. The knowledge worker does not need to write a single line of code in order to add to or develop the workflow system.

The workflow system provides a framework for workflow-enabled applications in virtually any existing IT environment. Its modular design and utilization of standard technologies such as JAVA™, Internet Inter-ORB Protocol (IIOP), Hyper-Text Markup Language (HTML), and Object Management Group (OMG) and Workflow Management Coalition (WfMC) protocols make it a truly interoperable product and allow for integration within almost any IT environment. The server architecture is a meta-model (model of models) for extending the workflow model and its elements. The server architecture is an open architecture which enables extensive server level integration. Additional components can easily be integrated with popular scripting languages such as JavaScript. The application-programming interface incorporates JavaBean technology for client extensibility and customization. And with the ability to utilize popular, third-party Web authoring tools, users can customize forms generated in the workflow system in a familiar and robust development environment.

To provide full functionality support for business workflow, the workflow system 10 comprises a workflow engine 12, a Client 14, a Database (DB) Adapter 16, a Script Adapter 18, and a Document/Directory (DD) Adapter 20 which comprises a Document Management System ((DMS)) Adapter 22 and a Directory Services Adapter 24. The modular architecture of the workflow system and the open pluggable adapter APIs ease the effort of integrating different document management systems, directory services, DataBase management systems, and server-side script interpreters. Even the client APIs are modularized and componentized. Thus, the Client, Server, and adapter components may be installed on different machines to distribute the load, thereby improving the performance of the workflow system.

The workflow system connects seamlessly with many popular document management systems, directory services, databases, and scripting languages via its "adapter object" technology. "Adapter Object" technology enables the server to communicate with the necessary IT infrastructure components: Document Management Systems, Directory Services, and Database Management Systems. An adapter for script interpreters also enables integration with additional components through common scripting languages. This leverages the investment an organization has made in its IT infrastructure as well as allowing the integration of emerging technologies, thereby protecting against "vendor lock-in." ("Vendor lock-in" occurs when an organization is committed to a vendor because of the substantial costs associated with switching vendors). Moreover, the workflow system requires no new supporting workflow applications or infrastructure products to be forced upon a Management Information System (MIS). In the preferred embodiment of the invention, the workflow system supports multiple server configurations including remote subprocesses and workitem notification forwarding. Scalability can be extended to support at least 100 users per single server.

The main component of the workflow system is the workflow engine. The workflow system provides a robust workflow engine for Independent Service/Software Vendors (ISVs) and Value Added Retailers (VARs). ISVs have their own product and may use other products to enhance their own product. VARs do not have their own product, but add to other products, thus making a more desirable product. As a workflow development tool, the workflow system provides ISVs with a fully featured and interoperable engine with which to "workflow enable" their existing applications, thereby creating new functionality. Additionally, the workflow system provides VARs and other third-party integrators a tool with which to easily create specialized and robust custom workflow solutions for use in almost any IT environment.

In the preferred embodiment, the workflow engine resides on a server and is 100% Java-based. The workflow engine negotiates interaction between users and other components, enacts processes started by users, and notifies users of changes in status within a process. The workflow engine supports over 100 real-time (tethered) users and up to 1000 "casual" (non-tethered) users via the Web, simultaneously, all from a single system. For real-time users, no store and forwarding is required. As organizations grow and processes evolve, the workflow system's modular architecture can easily scale to handle an increase in transaction throughput.

In the preferred embodiment, transfer of information between the Server and the Client occurs over a Common Object Request Broker Architecture (CORBA) link. The CORBA interface is a platform independent and language independent interface, and use of a CORBA interface enables users to interface to objects instead of processes. In the preferred embodiment, the server provides a CORBA protocol, the Internet Inter-ORB Protocol (IIOP) 26, which is an Object Request Broker (ORB) protocol standard of the Object Management Group (OMG). Use of the IIOP enables the workflow system objects to be exposed to applications and client tools. In addition, the use of the IIOP enables the workflow system to be highly extensible for integration with present and future technologies. The Server transfers mail and contains software that manages the network. The Mail Adapter 28 may interface to a variety of mail systems. In the preferred embodiment, the Server may use either the Simple Mail Transfer Protocol (SMTP) 29 or the Short Message Service (SMS) 30 for transferring mail. SMTP is an electronic mail system with both host and user sections. SMTP is the ubiquitous standard for outgoing e-mail protocol, for sending mail to the mail server that is going to be distributing the mail. The SMTP user software is often included as a utility in TCP/IP packages for personal computers. SMS is a system for sending and receiving text messages and is implemented in most Global System for Mobile Communications (GSM) networks. SMS is the protocol for sending digital pager messages or digital phone messages.

Figure 2:
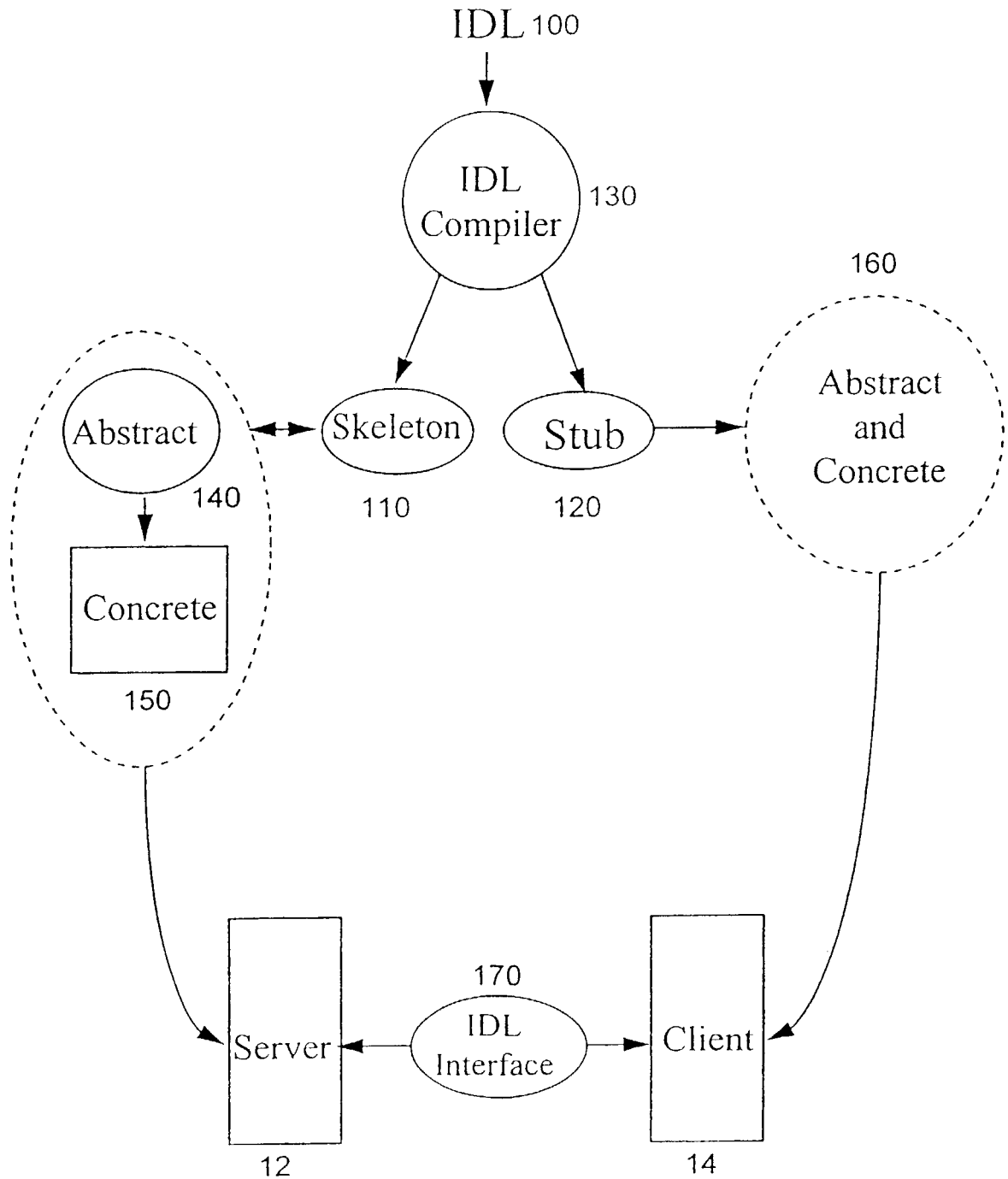
FIG. 2 shows a block diagram of the various elements involved in creating a skeleton and stub.

CORBA is defined by the Object Management Group (OMG) of Farmingham, Mass. OMG published the CORBA/IIOP 2.2 Specification, which is hereby incorporated by reference as if set forth herein in its entirety. FIG. 2 shows a block diagram of the various elements involved in creating a skeleton and stub. One of the central concepts to CORBA is the use of the Interface Definition Language (IDL). IDL definitions 100 enable the creation of language and platform independent clients and objects. A skeleton 110 of an object can be created from an IDL definition. The skeleton can then be developed for a particular language for use on a particular platform. The object on the server communicates with the client via an IDL interface 170. As long as the skeleton is used for the development of an object, then the object can communicate with any client that is created using the same IDL definition. A stub 120 of a client can be created from an IDL definition. The client can then be developed for a particular language for use on a particular platform. Again, as long as the IDL stub is used for the development of a client, then the client can communicate with any object created using the same IDL definition. The server and client can communicate with each other via an interface which is defined using the IDL. An IDL compiler 130, from a third party vendor, compiles the IDL code into compiled code for a skeleton or stub. Compiled skeleton code reflects an abstract class 140 which when developed is made into a concrete object 150. The concrete object then becomes a part of the workflow engine. Compiled stub code reflects an abstract client which is also a concrete client 160. The client 14 uses the stub to communicate to the server 12.

The stub is both abstract and concrete. The developer takes the stub and uses it on the client side and there is no more implementation on the client side. On the server side, the developer is given the abstract. Then, the developer materializes the skeleton and creates a concrete class. When the developer is generating the stub, the developer is generating the concrete as well as the abstract. For the skeleton, the developer has to develop the concrete. For the skeleton, there is a development step, whereas for the stub there is no development step. For the skeleton, the developer defines the interface, then creates the concrete code that actually implements that interface. For the stub, the developer uses the stub to connect to the implementation.

As shown in FIG. 1, the client runs in a web browser 32. The workflow system client utilizes the native Web user interface, not an ad-hoc Web interface dependent upon a traditional thick client architecture. Since the workflow system utilizes popular Web browsers, no installation of special workflow related client software is required—resulting in no additional client administration costs. In the preferred embodiment, the workflow system utilizes the popular Web browsers Microsoft® Internet Explorer™ and Netscape® Navigator™. The workflow system provides a web client structure whereby a user may access the engine via a provided workflow system client or a customized client developed using the workflow system's API. Adapter APIs are provided so that a user may develop adapters specific to the user's configuration. Providing default system clients together with their associated APIs allows for rapid customization, extension, and composition of new clients or applications. The default system clients are easy to deploy, manage and support because of their simple, easy-to-learn user interfaces. The simple user interfaces promotes user participation in automated processes.

Unlike other systems, the workflow system adapter technology supports integration of the workflow system with virtually any existing IT infrastructures because the workflow system architecture is adapter-based to allow integration with third party products. An Information System (IS) infrastructure can be easily integrated with the workflow system. Adapters enable the Server to communicate with the other components. An adapter behaves as a converter which allows the Server to speak to a common interface. Just as adapters, in the traditional sense of the word, are used to connect two parts which do not directly connect, these adapters have a similar function. Only adapters which suit a particular environment configuration need to be installed.

In the preferred embodiment of the invention, the Database (DB) adapter uses the Java DataBase Connectivity (JDBC) standard and provides the communication mechanism between the Server and a database server. The purpose of a (DMS) is for storage of persistent process attributes. "Persistent" means that if the workflow system power is shut down, no process attributes will be lost. In the preferred embodiment, process attributes are stored on disk upon system shutdown. The database 34 maintains process information. In the preferred embodiment, database adapters include Microsoft SQL Server via JDBC and Oracle® Oracle7™ v7.3 via JDBC.

When the workflow system starts executing, three objects are available from the naming service: Document/Directory (DD) framework 20, (DMS) adapter 22, and DS adapter 24. The DD Adapter is two adapters rolled into one: the (DMS) adapter and the DS adapter. The DS and (DMS) are autonomous, i.e., exist separate from each other. The structure of the DD framework allows for the (DMS) and DS to be from different vendors. For example, splitting the DS from the (DMS) allows for the use of an Exchange directory with a Lotus (DMS). The purpose of a (DMS) is for centralized "check-in and check-out" storage of documents. The (DMS) is used to store forms, attachments, and templates. The DD Adapter uses the DS to authenticate users and perform role resolution. In the preferred embodiment, supported products include: Light-weight Directory Access Protocol (LDAP) through Java Native Directory Interface (JNDI), Microsoft Exchange™, and Microsoft NT™ User Registry.

The workflow system can be integrated with any (DMS). A (DMS) adapter is provided for Windows Microsoft Exchange 36, Java Development Kit™ (JDK) 37, and NT™ File System 38. A DS Adapter is provided for Microsoft Exchange™ 39, LDAP 40, and Windows NT™ Users Registry 41. Java provides a view of the file system that is platform independent.

Figure 3:
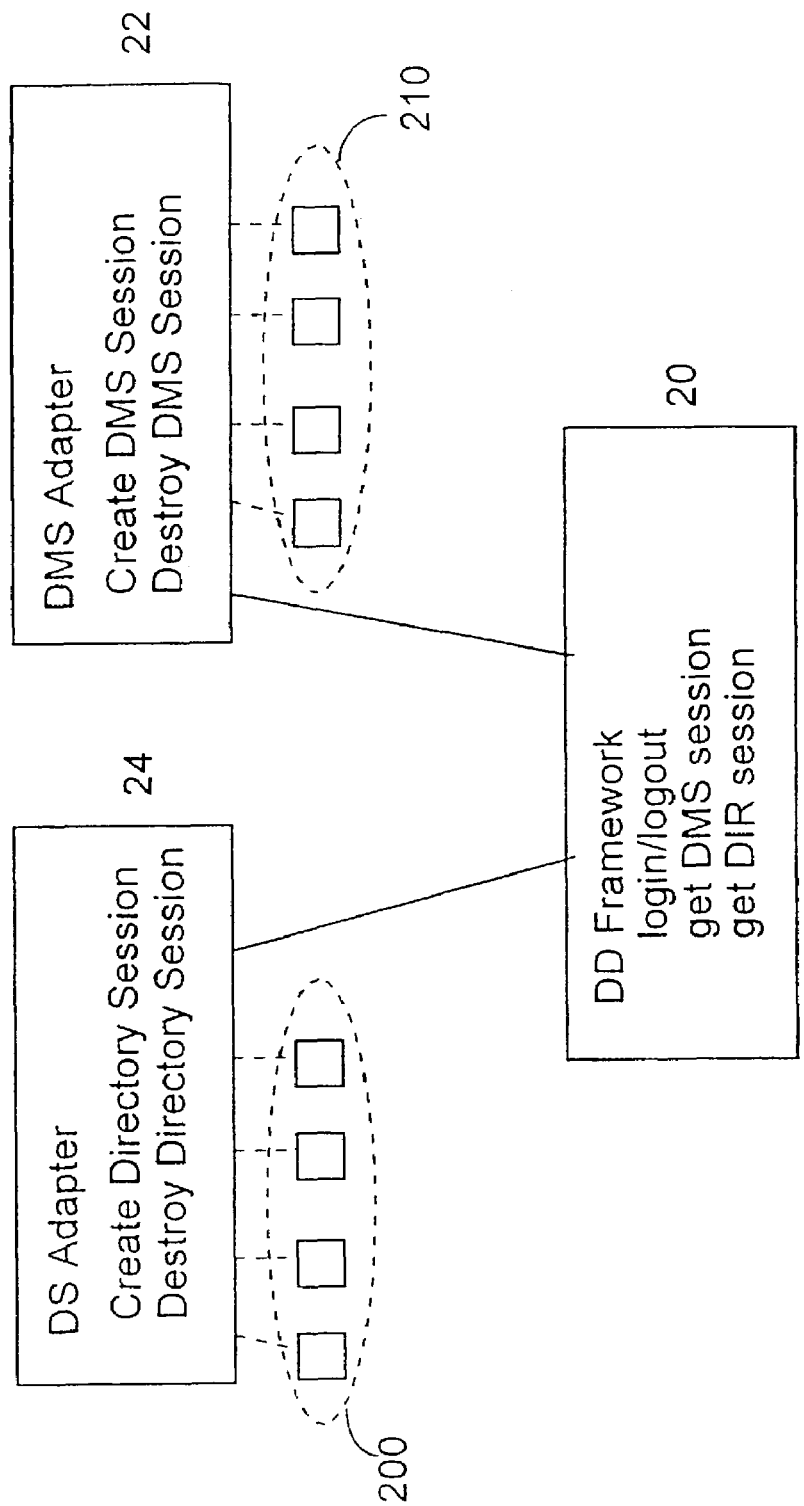
FIG. 3 illustrates the DD-(DMS)-(DS) structure.

The DD adapter, the Directory adapter, and the (DMS) adapter comprise a minimum set of functions to make their use as simple as possible and so that they can be brought up as quickly as possible. FIG. 3 illustrates the DD-(DMS)-DS structure. The DS adapter creates directory session objects 200. The (DMS) adapter creates (DMS) session objects 210.

The DD adapter comprises the following functions: (1) login, (2) logout, (3) get the (DMS) object, and (4) get the directory object.

The Directory adapter comprises the following functions: (1) Create a directory session object for a specified user. (2) Destroy a directory session object. (3) Return the list of users for a specified group. (4) Return the list of users in a specified group as one long string. (5) Return the list of groups. (6) Return all the properties (Name-Value pairs) for the specified user. (7) Create the specified properties (Name-Value pairs) for the specified user. (8) Update the specified properties (Name-Value pairs) for the specified user. (9) Delete the properties of the specified user. Item (6) above, the ability to return all the properties for a specified user, is needed by the workflow system to customize the workflow system for the benefit of the person doing the task. Items (7) and (8) above are for creating and updating a user profile, respectively.

The (DMS) adapter comprises the following functions: (1) Create a (DMS) session object for the specified user. (2) Destroy the (DMS) session object. (3) Return the list of documents/directories for the specified path, i.e., provides the document members of a folder. (4) Check out the specified file for read or write. It creates a copy of the file with a unique filename and copies that file onto the client machine under the path specified in the configuration file. (5) Check in the given file. (6) Return the path of the attachment directory where files are checked out for read mode for a particular user. (7) Return the path of the attachment directory where files are checked out for write mode for a particular user. (8) Check in the specified new file to the specified path. (9) Return all drives available on the machine where the DD adapter is running.

CORBA allows for the use of a naming service. The naming service adds a layer between CORBA objects and clients, such that the client does not need to know the identity of the object or the server on which the object is running. Rather, the naming service contains this information, allowing objects to be moved around between servers by notifying the naming service without having to notify each of the clients that may seek to utilize the object. Use of the naming service in the workflow system enables a generic architecture independent of a particular implementation. The workflow system utilizes the naming service to distribute and partition the load.

Each workflow system component has a section in an initialization file. The initialization file tells each component that when the component registers with the naming service, it will be registered under a name provided by the naming service, X for example. The naming service binds X to a (DMS) object. Continuing with the example, the initialization file tells the DD framework component that the DD framework's name is Z and that the names of the components that the DD framework can utilize are X for the (DMS) adapter and Y for the DS adapter. That is how the DD framework knows about the (DMS) adapter and the DS adapter. Similarly, in order for the server to find the DD framework it is looking for, the naming service tells the server when the server comes up, that the DD framework is called Z. The effect is that the user can bring up another set of adapters on the same machine with different names and can let them depend on each other. Thus, the workflow system can have another configuration with very different components. This allows multiple components to coexist on the same platform. Consequently, the user can have multiple configurations and can bootdown and change the (DMS) adapter just by changing the configuration file. This allows for failover. Each of the components can run on a separate machine. If a malfunction happens (eg. the (DMS) adapter went down.) on the machine that the component is running on, such as X on host 1, because something became corrupted on host 1, the user can transfer a copy of the (DMS) adapter to host 2 and tell host 2 via the host 2 configuration file that the name of the (DMS) adapter is X. The workflow system goes to the naming hierarchy and replaces the old X with the new X binding and the whole system works again.

Failover is usually for disaster recovery. The machine crashed, power went off, and the user needs to switch over to another host. The particular component, the (DMS) for example, is binded to the actual object reference. The DD framework talks to the actual object reference. The DD framework does the resolution on the name. The configuration file tells the DD framework that the (DMS) adapter is called X. When the DD framework starts up, it searches for X, and resolves the address for X, associating and binding X to the actual (DMS) object. The advantage is that the system should not ever be down, and should be up 7 days a week, 24 hours a day. Failover is needed to do continuous operation. Thus, when host1 fails, the user switches over to host2 which has the same (DMS) adapter as host1. The system will not stop functioning just because one of the platforms that the system is running on fails or gets corrupted. This failover applies to the whole system architecture. Similarly, when the client starts up, within the client, the workflow system in effect says to the client, "This is the naming service you go and look for the servers on." Hence, the user can selectively access multiple servers from the client, and at the same time that is how the client latches onto the server. So the server may have crashed on machine1, but the workflow system is totally independent of any machine names or specific platforms. The workflow system is only dependent on the naming service. And even if the naming service crashes, it can brought up from another machine. The flexible binding also allows for load partitioning and balancing (distribution of the load) because a workflow system embodiment can have multiple hosts and the Directory adapter can be put on one host, the (DMS) adapter on another host, and servers on yet another machine.

The load partitioning is not a function of the naming service. It is a function of the way the system is set up, of the way that components are allocated to the available machinery. The user can utilize any naming service independent of any particular hardware platform. "Naming service" is a generic term. The CORBA naming service is for CORBA applications. RMI registry is the naming service for RMI. RMI is the equivalent of CORBA for the Java environment.

Figure 4:
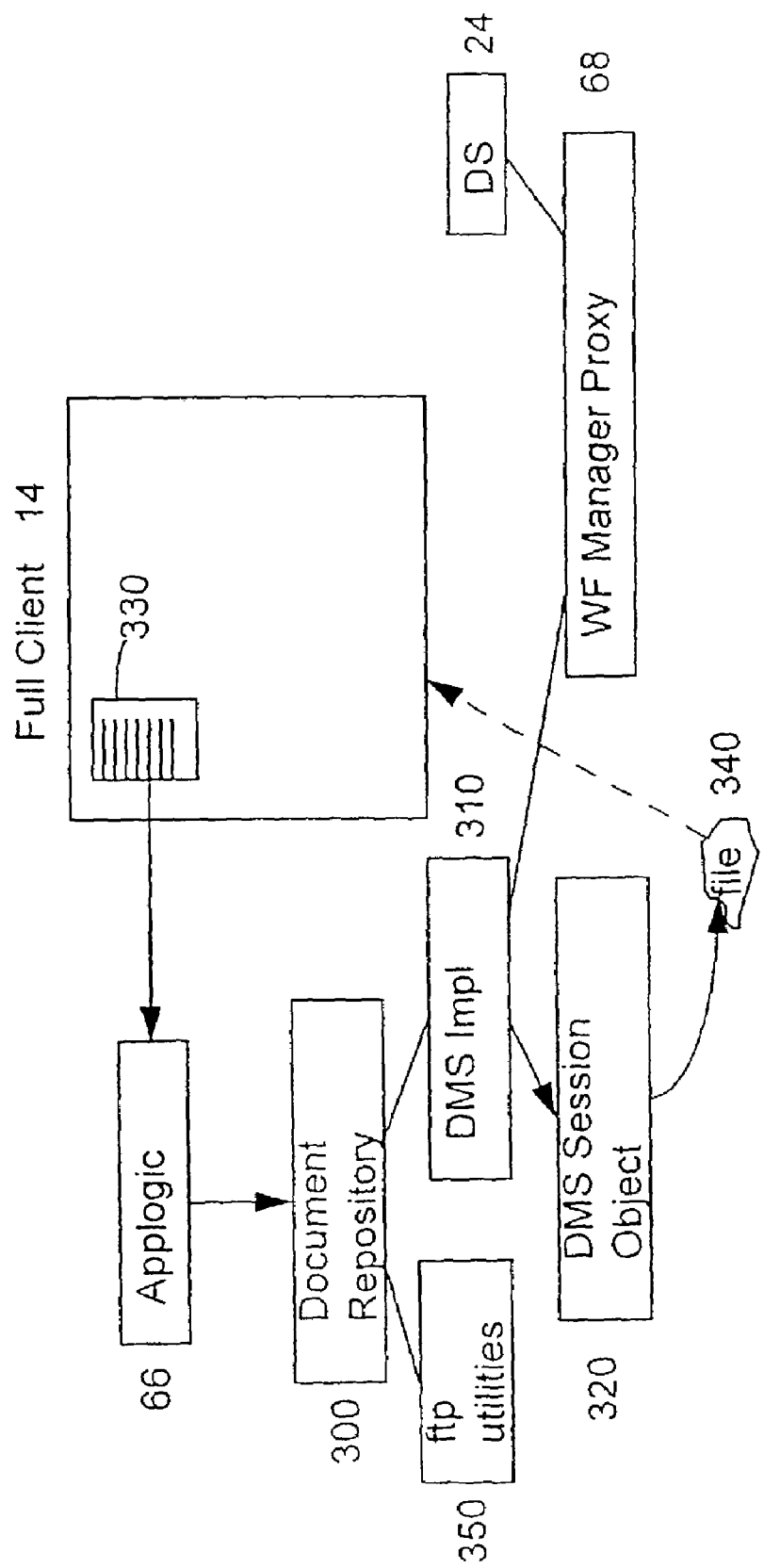
FIG. 4 shows the interaction between the client and (DMS) elements.

FIG. 4 shows the interaction between the client 14 and (DMS) elements. The document repository 300, (DMS) Impl ((DMS) implementation) 310, and (DMS) Session Object 320 are separate (DMS) elements. When the user selects an item from the drop down menu 330, the applogic 66 receives the event and sends a message indicating the desired item to the document repository. The document repository then commands (DMS) Impl to carry out the selected item. Then, (DMS) Impl utilizing WF Manager 68 and DS 24 creates a (DMS) Session Object which checks the desired item into a file 340 on the server machine. Once this operation is done, the document repository provides a set of ftp utilities 350 which takes the file and launches it.

FIG. 1 shows the Script adapter 18 and Mail adapter 28 are both coupled to the Workflow Engine via an IIOP interface.

The Script adapter 18 interprets scripts entered at the client and external server-side scripts. In the preferred embodiment, the script interpreter is the JavaScript ECMA interpreter 42. The Mail adapter 28 provides the communication mechanism between the Server and a mail server. In the preferred embodiment, SMTP is used. The Mail adapter does not need to be installed if the e-mail notification feature of the workflow system is used. The Notification Facility notifies the user of assigned work items through E-mail.

The APIs which are provided on the server are open APIs so that the developer may develop his or her own adapters which work with other systems. "Open" means that the APIs are published so that users may create their own adapters.

Figure 5:
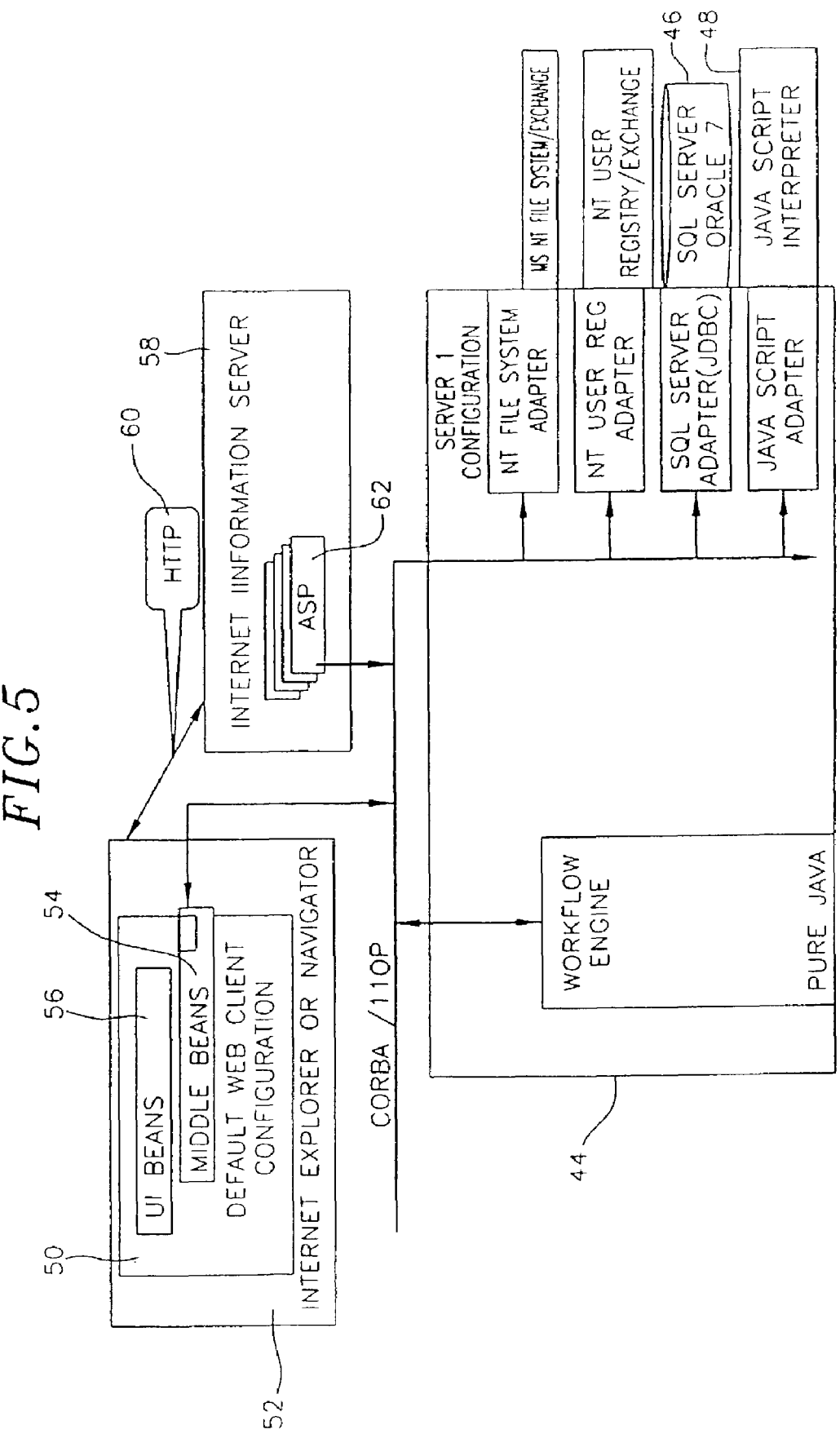
FIG. 5 is the workflow system architecture for a single server configuration.

FIG. 5 is the workflow system architecture 10 for a single server configuration 44. In a preferred embodiment, the workflow engine is a standalone Java server. The workflow system server provides a CORBA/IIOP interface 26 that exposes its objects to applications and client tools. The Server updates the Client with status changes and updates template and process data per requests. In addition, it notifies users of tasks via e-mail, SMS, and/or proactive updating. The workflow system is e-mail client based.

The workflow system server consists of five processes, namely, the workflow engine, the DB adapter, the (DMS) adapter, the directory adapter, and the script interpreter adapter. The Server communicates with the DB adapter to maintain process state data, process and activity-relevant data, and process history information. The Server controls database request queues. The Server interacts with the Script Interpreter by passing it scripts via the adapter and accepting results. The Server communicates with the Document/Directory (DD) adapter which holds the user's context, maintains pointers to the location where (DMS) forms and attachments are stored, and accesses the Directory Service to perform authentication and role resolution. When a user logs in, they get a client id. With the client id, the user can get a directory session object or a (DMS) session object which reside in the directory adapter or the (DMS) adapter, respectively. The directory adapter and the (DMS) adapter are the factories for the directory session object and (DMS) session object, respectively. The interface between an application on one hand, and the (DMS) and DS on the other, is implemented with concrete classes. The (DMS) class and the DS class have interfaces on the client side. The advantage of using the workflow system (DMS) and DS APIs, is that a user can take a client application and run it on another system with another (DMS) and DS. The user can replace the adapter without disturbing the interface.

In the embodiment shown in FIG. 5, the (DMS) adapter 22 is the NT File system adapter for interfacing with the NT file system. The directory adapter is the NT User Registry adapter for interfacing with the NT Users Registry. The DataBase Management System (DBMS) adapter 16 is a System Query Language (SQL) adapter, the Java Database Connectivity (JDBC) adapter, for interfacing with an SQL server 46. The script interpreter adapter 18 is the JavaScript adapter for interfacing with the JavaScript interpreter 48.

The workflow engine accesses the DBMS through the DBMS adapter, the directory services through directory adapter, the document management repository through the (DMS) adapter, and the script interpreter through the script adapter. The workflow engine utilizes the DBMS to support the persistify workflow processes; the directory services to carry out authentication and role resolution; the (DMS) to store attachments, forms, and process template files; the script interpreter to evaluate server-side scripts.

The workflow system architecture is a layered system with an open architecture. In order to open the workflow system to a variety of elements at each layer, the Client runs in a web browser and the client architecture is comprised of a combination of Java applets and JavaBean components. FIG. 5 indicates access to a default web client configuration 50 via Internet Explorer 52. The default client configuration comprises two client component layers: a model layer 54 and a user interface (UI) layer 56. The IIOP is at the interface level. The models are layered above the IIOP layer. The User Interface (UI) is layered over the model layer. The model layer can be viewed as an intermediary layer between the Server and the UI. The model layer encapsulates the state of the client objects and interacts with the Server via CORBA IIOP. The UI components are for Web-client presentation and can be customized to meet the visual needs of the user. If a user already has a UI, then the user only needs the workflow system APIs in the model layer. The Web client (Model and UI components) can be easily reconfigured, extended or customized in the palettes of third-party Web-development tools such as JavaStudio™ from Sun Microsystems®. The Web client can be easily reconfigured due to the modularity and customizability of the client components. The modularity and functional breakdown of the client components allows for easy reconfiguration. The Bean components allow for customization and extension through builder tools.

In FIG. 5, the client communicates with an Internet Information Server 58 via the HTTP protocol 60. The HTTP interface is a URL based interface that is responsible for providing dynamically composed web pages to and from the client. An Internet Information Server's Active Server Page (ASP) 62 communicates with the workflow system server via the CORBA IIOP.

Figure 6:
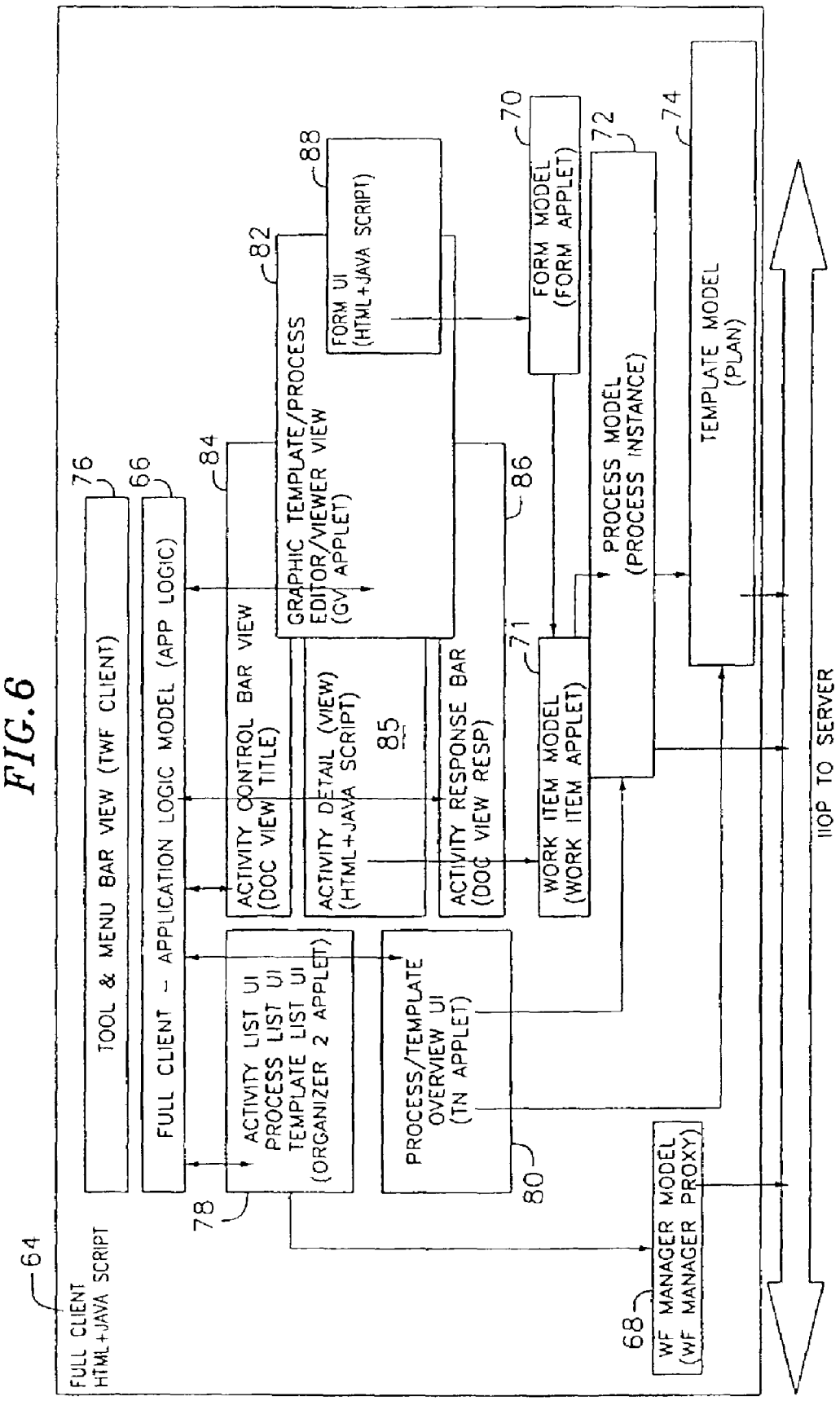
FIG. 6 illustrates the default structure of the web client.

FIG. 6 illustrates the default structure of a web client. The web client comprises a combination of Java Applets and/or JavaBean components. These client components are wired together using Java Script and HTML 64. The Client is componentized so that all java beans can operate stand-alone. Implementation solutions may use all or some of the java beans.

Systems other than the workflow system have web clients, but they are not truly open. Other system's clients have limitations that are tied to proprietary systems and are limited in large part due to migration issues. Other workflow systems have failed because they required software to be installed on user machines. They were client-server based instead of being web-based. The workflow system has its clients on a web server rather than on a user machine.

The component architecture for the workflow system Client is based on JavaBeans because JavaBeans allows users to flexibly reassemble software user interface components, thus allowing the user to create a workflow system which best suits the user's needs. The beans allows the user to access and manipulate all aspects of the workflow system, including its administration. The workflow system functionality can be extended and/or integrated with third party products and tools. Since JavaBeans are platform-neutral, the developer can develop for any OS within any application environment.

The client components are strictly structured in two layers, namely a model components layer and a UI components layer. Model components are used to encapsulate the state of the client objects and interactions with the server via CORBA IIOP. The purpose of the client UI components is to provide different components of the workflow system user interface, e.g. organizer, thumbnail overview of the process, or detailed view. These components will not be maintaining client objects or carry out interaction with the workflow system server. The client components are designed so as to be easily imported to the palette of visual development tools such as Visual Java Script from Netscape or Visual Studio from Sun Microsystems. Having such components available for third party tools allows the easy reconfiguration, extension and customization of the client. Thus, if a user does not wish to create an entirely new client from scratch, he can customize the default workflow system client, thereby creating a custom client.

The model components include the Application Logic (AppLogic) 66, the WorkFlow (WF) Manager Model 68, the Form Model 70, the Workitem Model 71, the Process Model 72, and the Template Mode 74. In FIG. 6, the names between the parentheses, other than HTML and JavaScript, are the class names. The Application logic model is responsible for the coordination and event dispatching among all components of the client. The WFManager model is responsible for login/logout and retrieving lists from the server. The Form Model is responsible for the data exchange between forms and the process component. The Workitem Model is responsible for workitems, i.e., any activity which awaits to be addressed. The Process Model is responsible for process instances. The Template Model is responsible for plans, i.e., process templates.

To support comprehensive report generation, the UI is comprised of the Menu & Tool Bar 76, the Organizer 78, the Overview 80, the Process/template viewer/editor 82, the Activity control bar 84, the Activity detailed view 85, the Activity response bar 86, and the form view 88. The Organizer presents list of processes, process definitions, and workitems. The Overview presents a miniature thumbnail overview of a selected process or a process definition. The thumbnail overview is a graphical representation of the selected process or process definition. The Process/template viewer/editor enables the viewing/editing of processes and process definitions. The activity bar enables access to attachments and forms. The response bar enables the user to specify the completion of an activity with a particular choice. The form view presents the content of a user-defined form.

The Thin Client is a subset of the Full Client. The activity detailed view comprises the activity bar 84, the response bar 86, and the form view 88. An embodiment of the invention may have either the thin client view or the graphic view displayed wherein they do not coexist at the same time; however, the user can switch between the thin client view and the graphic view for the same activity. The thin client view and the graphic view can be substituted for each other because they are different ways of viewing an activity. The three pieces of the thin client or the graphic view comprises the target area of the Developer Client screen layout. Another embodiment of the invention may have both the thin client view and the graphic view displayed at the same time.

The workflow system allows a knowledge worker to define meaningful workflow processes by creating process models without having to do any scripting or programming. These process models are easily created and modified visually, either before process initiation or "on-the-fly," with the feature-rich graphical user interface. A process model is implemented via a process instance. A process instance is a collaboration medium by which a workflow process is modeled. A process instance is created from a plan template. A process instance is composed of a shared data space referred to as process attributes and a plan (a.k.a. process definition or template). A process attribute could be a persistent data element or a link to an external information source such as a document. Process attributes are sometimes referred to collectively as process-relevant data.

Both processes and activities may be active. An active process or activity is one that is awaiting human response. Many process instances can be active at any one time and can be created from the same or different plan templates. Process templates can be edited offline and can be dynamically edited online. Process change control dynamically updates process instances and plan templates. The process instances continue to be related to the plan template from which they were created, thereby allowing a user to modify a plan template in run time by modifying the characteristics of a process instance. A process instance can be used to create a personal template. The platform independent nature of the CORBA interface and the JAVA language within the embodied workflow architecture enables process instances to be on many different computer platforms and enables the dynamic modification of both the process instances and the plan templates. Since the workflow system is not tied to any one computer system, the workflow system does not place any size restrictions on template and process sizes.

A plan is composed of a set of nodes that are networked via arrows. Each node represents an activity (business activity) or a flow control operator. Arrows represent a path between two nodes. An activity is capable of generating events on their outgoing arrows when they are in an active state (ready to be performed), and more than one activity may be active at a time. Different node types may have different behavior in responding to incoming events. A node can be assigned a role if it represents an activity that requires the involvement of a user. Roles are associated with users and are maintained in an organization directory. Multiple users may be assigned the same role and a user play multiple roles. There is a special node that identifies the starting point of a plan referred to as a start node and another that identifies a termination point in a plan, referred to as an exit node. A valid plan must have one start node. A plan may have more than one exit node. Nodes have attributes of their own.

All aspects of a process including its plan may be modified at any stage of its life cycle. A process can be created using an incomplete plan. Modifying and extending a process plan at any time is one of the salient features of the workflow system. When a process instance is created, it is assigned a plan to enact. A process instance can be thought of as a plan in execution. Plans are static, reusable process models. After a process instance is created, it could be activated either manually or automatically. The activation of a process causes its start node to become active and immediately generate events on all its outgoing arrows. Different node types may have different behavior in responding to an event arriving on one of their incoming arrows.

The workflow system has a set of predefined node types which include the Start Node, the Exit Node, the Condition Node, the OR Node, the AND Node, the Activity Node, the Subplan, and the Split Activity Node. Each node has its own attributes. The Start Node demarcates the starting point of a plan. Any plan must have a start node. The Exit Node demarcates a termination point of a plan. The exit node causes the process to terminate, when it receives an event on one of its incoming arrows. The Condition Node provides conditional branching. The Condition node is a process flow control node which halts process flow unless a specified criteria is satisfied. Each one of its outgoing arrows can be associated with a condition. The condition is specified as relational expression relative to a specified process attribute. When a condition node receives an event on one of its incoming arrows, it generates an event on the first outgoing arrow whose relational expression evaluates to true. If all expressions fail to evaluate to true the an event is fired along the default arrow. The OR node is a process flow control node which continues process flow as soon as it is reached. The OR Node starts parallel branches by generating events on all outgoing arrows when it receives an event on any of its incoming arrows. The AND node is a process flow control node which forces activities to be synchronized. The AND node joins parallel branches by generating events on all its outgoing arrows when and only when it receives an event from each of its incoming arrows. The Activity node is a graphical representation of an activity that requires user interaction. When this type of node becomes active all members of the role assigned to the node are notified. Notification can be routed to the client or via E-mail (according the user's profile). The activity node can be assigned one or more forms to allow user access to the attributes of the containing process. An activity may also be assigned one or more files as an attachment. The Subplan node allows the user to reuse an existing plan into the body of another plan. The Split Activity Node is an activity node that is automatically replicated at runtime. Each of the activity replicas is assigned to one of the members of the role assigned to the node.

The Workflow system set of predefined arrow types includes an arrow which connects two nodes by propagating events generated by its predecessor node to its successor node. Each arrow has the label property.

Each node has its own attributes. All Node types have the following predefined properties: Label, Prolog script, and Epilog script. Each node, like a process, can have user-defined attributes. User-defined attributes can have a name and value type that the user specifies at design time. The Activity Node and Split Activity Node have the following additional properties: Role, Description, Forms, Attachments, and Priority. Every activity node has a dynamic property referred to as choices. The choice property enumerates the node's outgoing arrows. The choice property is used to enable the user to go to the arrow on which an event is propagated.

Within the workflow system, tasks are assigned to users through "roles." (A role is the logical grouping of a set of users, such as the user groups contained within an organizational directory, e.g., LDAP). The workflow system can easily handle changes or uncertainties in task assignment with Dynamic Role Assignment/Management: the dynamic assignment of users to tasks depending on position, workload, or some other user-defined variable through scripting. This feature allows a process to continue uninterrupted should a person assigned to a task be unavailable. It also eliminates the need for the process definition to be updated each time there are personnel changes. The flexibility to assign or reassign personnel during process definition and after initiation greatly simplifies the maintenance of a workflow solution.

An activity at design time is assigned to a role. At runtime, that role is resolved into a user. The workflow system searches the directory to see who can carry out the role. The purpose of the role is to identify the users capable of and/or authorized to carry out the task represented by the activity node. These users are also referred to as the Assignees of the activity. Each activity node or split activity node is assigned a role. Assignees are notified of their assignment to work on activities.

Any workflow system user can be assigned to multiple roles. The role information is maintained in the user directory service. The workflow system server accesses the directory service to authenticate users and identify their assigned roles and their capabilities in accessing and manipulating processes, activities, and their attributes. The use of roles eliminates the need to modify every process definition when there is a personnel change. Instead, only the group definition in the Directory Service needs to be updated.

An activity node may be assigned a static role such as clerk or a context sensitive role such as managerOf. A context sensitive role is specified as a Java script. The java script is evaluated at node activation time. Evaluation of the script will return one or more users to be assigned to the activity. The workflow system provides a set of JavaScript commands that support the implementation of context sensitive role resolution.

A subprocess is a plan that is instantiated and associated dynamically with an activity node that is active. When a subprocess is associated with an activity node, the activity node is suspended and the associated subprocess is activated to carry out the task represented by the parent activity. This feature provides autonomy to the user responsible for carrying out an activity to decide the best course of action for accomplishing the activity's goals. When a process plan permeates multiple organizations it is not practical to assume that all organizations behave the same way in carrying out a particular activity.

Scripts can be associated with the plan and its nodes to extend their functionality and provide automation of activities that does not require user interaction. Scripts are evaluated by the server and in the preferred embodiment are in the Java Script scripting language. Scripting automates tasks, thereby allowing tasks to be performed without user involvement. Scripts can be created to manipulate attributes of a process and scripts enable access to external applications/systems, thereby providing a user-defined extension framework.

Scripting is a language needed to complement the graphic designer. Sometimes, the graphic paradigm does not enable a user to easily and practically define something that is algorithmic, procedural, or arithmetic in nature. Thus, a user often has difficulty graphically designing an arithmetic expression like "x+y." However, in a scripting language it is much easier to do arithmetic expressions. Scripting allows access to process attributes via standard script extensions. The provided script extensions lets users access process attributes because users often want to do arithmetic operations on attributes of a particular process. Scripting is also another means for a user being able to reach out to external systems through the workflow system framework.

A java class which has public methods on it can be designed using JDBC, IIOP, or DCOM, to be able to reach out to different applications. DCOM is Microsoft Distributed COM Object. COM stands for component. Microsoft has a component model that is very similar to Java in nature, but it is proprietary. DCOM is the distributed component model and is a way for accessing a remote item. DCOM and IIOP gives users access to different applications. If the application lends itself to DCOM, then the user can access DCOM. The idea is that the user builds the Javaclass whether it utilizes JDBC to access databases, IIOP to access IIOP accessible applications, or DCOM to access DCOM applications. The user inputs a configuration file to tell the server to load the java classes into the script adapter.

The (DMS) and DS are important enough that users need an adapter particularly for these. The script adapter is needed for other types of items. The Script adapter plays an important role in context-sensitive role resolution.

In designing a process, a user may specify an owner role and/or owner role script. For a particular activity, the process owner may specify an assignee role and/or an assignee role script. The process owner is not required to use both the assignee role and assignee role script, but may use any combination of them. When an activity has no assignee role and no assignee role script, the activity gets assigned to the owner of the process. When an activity has an assignee role (E.g. Role: claim adjuster), but no assignee role script, the process owner is saying that he knows statically who the people are who need to work on the activity and that one of them will have to do the activity, e.g., requiring a person who is a member of the claim adjusters to be assigned the activity. The claim adjuster role suffices in this case because it is not necessary that any particular claim adjuster handle the activity. In contrast, suppose at a later point in the process, the user wants to say that the person who did activity, A1, is also the person who must do activity, A2. Such a case requires a script. This is the case where the script wants to find out who did activity, A1, and wants to assign that person activity A2. The same actor who did activity, A1, gets assigned activity, A2. The actor is the person who actually did the task. No assignee role is specified because there are no particular qualifications outside of having done activity, A1, that the assignee must have. However, an assignee role script must be specified to ensure that the person doing activity, A1, does activity, A2. In the last permutation of the assignee role/assignee role script combinations, both the assignee role and assignee role script are specified. In this case, everybody in the organization can ask for approval. The script is implemented to FIG. out the actor and approval is by the manager of the actor, but the owner of the process wants to make sure there is no programming mistake, that the person specified by the script has certain qualifications and that is where the role comes in. The role has approval authorization, power of signature. Whomever is the member of this role has the power of signature. The final determination of the assignee is the intersection of those who satisfy the script and those who satisfy the role. Role resolution occurs by role or by role script. Similarly, whoever gets assigned as the owner of a process has to meet the owner role and/or owner role script.

Figure 7:
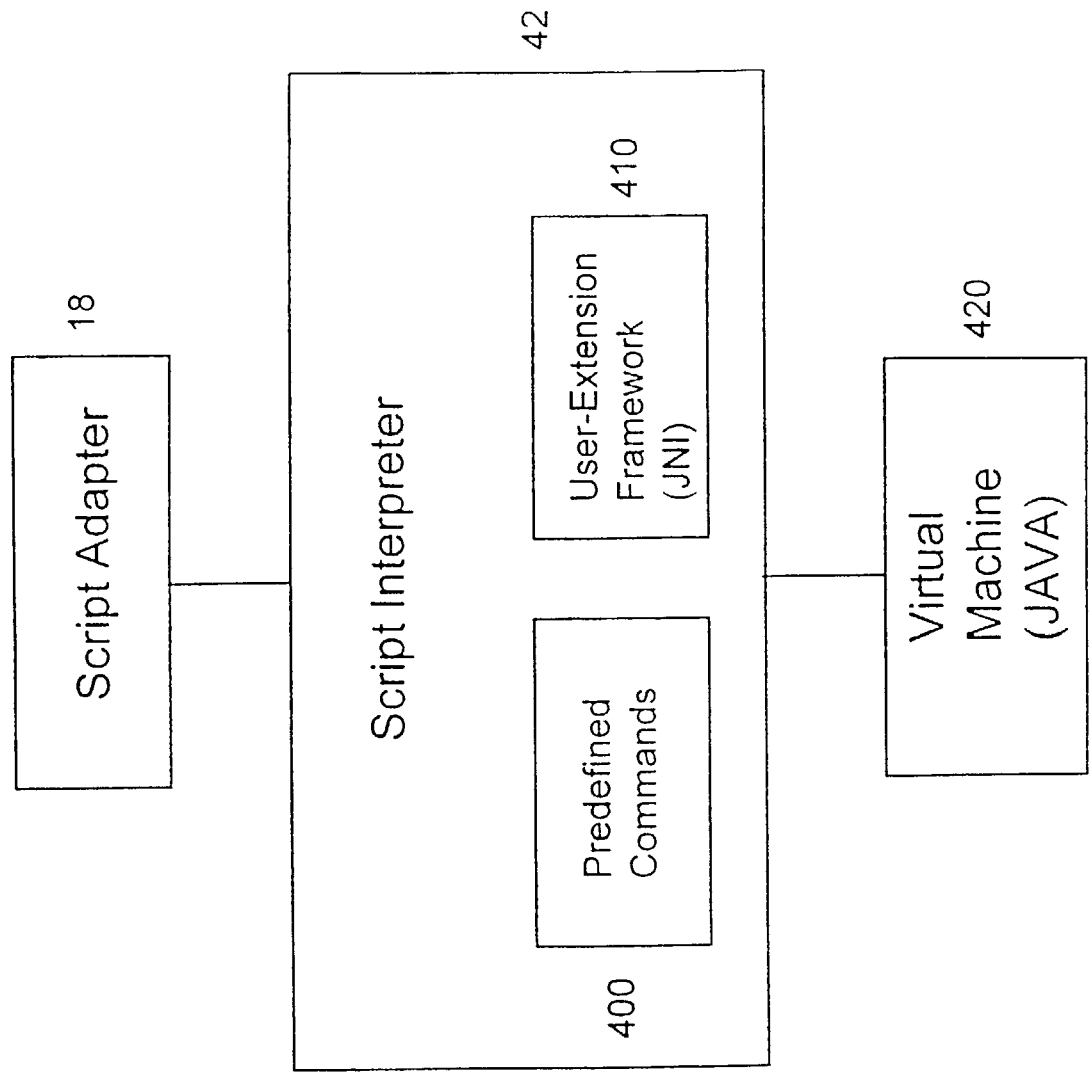
FIG. 7 shows a block diagram of the workflow system script framework.

FIG. 7 shows a block diagram of the workflow system script framework. The script adapter 18 is an adapter for connecting a script language interpreter 42 to the workflow engine. In the preferred embodiment, the script interpreter is a server-side script interpreter. The script interpreter processes script commands. The purpose of the script interpreter is to provide access to external applications via the Dynamic Invocation Interface (DII)/IIOP or Java extensions. The script interpreter interprets scripts entered through client and external server-side scripts. The script interpreter allows invocation of external server-side CORBA objects. The predefined script interpreter commands 400 provide the user who wants to write scripts access to the attributes of a process, activity, or system. The user extension framework 410 allows customers to add new script commands to the Java script interpreter and allows customers to develop Java classes whose methods can be used as commands from within the Java script interpreter. The user extension framework's purpose is to allow the customer to access external databases and applications; thus, enabling data flow between user-defined attributes of a process and the outside world. In the preferred embodiment, Java Native method Invocation (JNI) is used to implement the user extension framework in the Java script interpreter. JNI is a technology offered by Sun to allow interoperability between Java applications and non-Java applications. In the preferred embodiment, the script interpreter uses the JavaScript ECMA language. The Virtual Machine 420 is the Java language interpreter. Java is an interpreted language as opposed to C++ which is a compiled language and because Java is an interpreted language, Java code is portable.

Client side scripts are used for workflow system forms. Client scripting depends on the browser. Whatever scripting is available from the browser is available from the workflow system.

Client side scripts may be any scripts supported by a browser. The workflow system provides additional script components that enable scripts associated with the workflow system forms to access the process's and activity's attributes. Extending client side scripts with platform dependent functionality is available through the browser. The scripting that is available from the browser whether it is native to the browser or something that requires plug-in, is also made available through the workflow system. The scripts that a user is allowed to use on the client side are whatever the browser offers or whatever a user can extend the browser with.

In the preferred embodiment, the workflow system uses the European Computer Manufacturers Association (ECMA) standard JavaScript. In addition to the ECMA standard built-in commands, the workflow system provides additional commands for accessing and manipulating various aspects of a process and activities. The workflow system also allows third party integrators to extend JavaScript commands with their own extensions. The set of JavaScript commands can be extended in two ways: (1) Create a new JavaScript function based on the available functions, save to a file, then make such functions available by loading it to the JavaScript interpreter; and (2) Create a java class whose methods can be invoked from within the server-side Java Script. The java class method is used if access to external sources or external applications is needed. The purpose of these extensions is to allow the workflow system scripts to access legacy applications and external data stores through CORBA and Java.

The benefits of scripting include creating java classes, loading java classes, and allowing a script to have access to java classes. The JavaScript Interpreter includes built-in functions to allow loading of Java classes into the script adapter and their being accessible to a script. Two types of scripts that are process related scripts are the Owner script and the Role (assignee) script. The Owner script computes the owner(s) of a process instance. The Role script, also known as the Assignee script, computes the assignee(s) of an activity. Both of these scripts enable dynamic role resolution in the workflow system.

Two types of scripts may be specified for a plan. These plan-level scripts are the Init script and the Commit script. The purpose of the Init Script is the initialization of process attributes. The Init script is evaluated once when a process instance is created. The purpose of the Commit script is to validate the process attributes prior to the commitment of any transaction. The Init script and Commit script are both server side scripts.

Two types of scripts may be specified for an activity and conditional node; namely, the Prolog script (also called Body script) and the Epilog script. The Prolog script is evaluated when a node is activated, while the Epilog script is evaluated when a node is completed. An epilog script may also be specified for OR nodes and AND nodes. The Prolog and Epilog scripts are server side scripts.

Form creation is simple and does not require any database knowledge. In the past, there was a lot of database jargon that a user had to know in order to deal with process attributes. In the past, there were several steps that had to be taken before defining process attributes. Database data had to be defined; table fields had to specified; and tables required initialization. Rows in a table had to be initialized before the table could be used from within a process. In the preferred embodiment, process attributes are defined graphically and are independent of database jargon. The workflow system does not require users to know any database jargon. Databases have a lot of idiosyncracies, but since the workflow system defines process attributes graphically, process attribute definition is totally independent of the database.

A path to an HTML/Java Script form or any other web application or a document can be associated with an activity node. Forms are essential in any workflow management system and provide a means of exchanging information between the workflow system and other applications. Forms are created by specifying the process data items which will be displayed on the form. They can be associated with a process definition or instance. In the preferred embodiment, the workflow system uses HTML/Java Script form routing. Attachments, on the other hand, are free-form pre-existing documents which serve solely to present static information. Attachments may only be associated with process instances.

The Form Editor integrates with multiple third party tools which allows flow designers to customize and extend forms that are automatically generated from the workflow system process design tool.

The workflow system process design tool is the graphic designer for a process. "Process designer" and "graphic designer" are interchangeable terms. The process designer helps the user specify the elements of a form.

The Form Builder has two elements: (1) What are the process attributes that are in the form? Data content; and (2) Presentation and layout. The forms modularity allows for flexibly replaceable components. The graphic designer tool will help the user create a form based on the contents that is specified by the user. The user specifies what process attributes that the user wants on the form. Then the graphic designer generates/gives the user an HTML form. Since the workflow system graphic designer produces an HTML form, the user is able to use a large number of commercially available tools for customizing HTML forms. The graphic designer generates an HTML form with the specified data elements on it and with the hooks to the SDK run file so that the user can retrieve the elements and update them. The form is generated automatically from the user-specified elements and the server, through the SDK. There is a large industry for Web authoring tools. Page Mill from Adobe, Front Page, Net Fusion, and Visual Page are all web authoring tools that can take the html form and let the user design the layout and representation that the user likes. This is one way to make the form look nice. The user can also take the form and apply JavaScript and HTML to it without using any tools. The automatic generation of an HTML form creates a value chain for the workflow system. The form not only allows a user to interface with the server to be able to extend attributes of the process, but the form is also a medium for exchanging data with the outside world. Through these tools or through Java and html scripting, the user can take the generated form that got generated with a bunch of fields that are sort of wired/ connected to the process through the server and add new data elements using either the web authorizing tools or using the scripting which allows the user to interact or exchange data with external data sources. This automatic form generation has eliminated the need for a proprietary form builder tool. Thus, developers who are going to be customizing, developing, and extending these forms only need to have html industry wide experience which is a standard type of knowledge for web authoring.

Form generation is automatic. The innovation is doing the automatic generation of html forms because then the user can take advantage of the available commercial technology. The user can put some elements on the form using the web authoring tools or use scripting to exchange data with the outside world. Data may be exchanged with another database or with products like PeopleSoft etc. Through scripting or the tools, the user can also exchange data between the outside world and the process.

Just as the generation of HTML forms takes advantage of other technologies, the structure of the clients takes advantage of other technologies because most of the clients are at their core, HTML. For example, the thin client is basically an html form equipped with some applets. Consequently, the thin client can also be taken into the web authoring tool and customized.

Users can customize forms to suit their applications. The workflow system provides a mechanism for generating simple, austere forms. To embellish the form or to create hooks to other applications, a workflow-generated form can be pulled into any tool capable of modifying HTML pages, such as any HTML form editor, and the desired changes can be made.

There are limitations on customizing forms. Virtually any web authoring tool or even a text editor can be used to modify the html form created by the workflow system. However, the only requirements are that the form first be created with the workflow system and that neither the semantics of the fields within the form nor the form's filename and location be altered. The form must be created with the workflow system for two reasons: (1) The workflow system captures the proper semantics of the template's user-defined attributes and embeds this into the form; and (2) the workflow system remembers the context of the form so that when an activity becomes active, this context is recalled and expected of the form regardless of which medium was used to modify the form.

The forms generated by the workflow system are stored on the workflow Server machine and consist of a single column of fields. These fields represent user-defined template attributes (also referred to as dataitems). The appearance of the form may be changed so that there are multiple columns, a border is added, color is added, etc. Such presentation style alterations can easily be done with most any web-authoring tool. Examples of changes which require a more thorough understanding of HTML and JavaScript include: (1) changing a field into a different UI component, such as a checkbox; and (2) adding enhanced functions, such as to incorporate links to other repositories to accommodate database queries. The client invokes a form and some form fields are updated from the client's detailed view. Likewise, the user input from fields updates activity attributes.

A typical workflow application may include the following functions: Connect to the server; construct a process definition (template); obtain a work list, process definition, or a process instance list; view the history of a process; obtain statuses of processes and activities; start a new process instance; modify a process instance; define and associate a form with a process definition or instance; associate an attachment with a process instance; and execute an activity choice option.

The workflow system provides "out-of-the-box" Web clients. These predefined clients provide varying degrees of user participation and notification for all types of users. The workflow system has a modular componentized client structure. All the clients are built out of the same components. All the Client user interfaces are based on a few components. All the components are strung together using HTML and JavaScript so the components can mixed and matched or even deleted from the client using HTML and JavaScript. The functionality of the clients are arranged differently depending on usage. For organizations which require custom solutions, the workflow system Web clients utilize JavaBean component technology, enabling the client to easily be reconfigured, extended or customized in the palettes of popular third-party Web development tools. Each one of the components implements certain interfaces. The idea is that if a user does not like the way the interfaces are being presented, the user can build his own interface the way the user likes it. For example, the package Appinterfaces is the public interface (Thumbnail-View) for the thumbnail overview. As long as the user implements this interface, the user can remove the workflow system thumbnail overview and plug his in, similarly with the rest of the components. ThumbnailView is an interface which is able to identify the plan (template) or process instance which is currently displayed or dictate the plan (template) or process instance which is to be displayed. It supports selection update on an activity and process instance. Just as a user can substitute his own thumbnail overview for the workflow system thumbnail overview, the user can also substitute his own organizer interface for the workflow system organizer interface as long as the user implements the organizer public interface. A major purpose behind the component structure of the interfaces is that a user can provide his own interface for a given client.

The various components are separate HTML pages; therefore, they can run on separate browsers on the same machine. The way they interact and know about each other is that when one of the applets gets loaded, the first thing it does, is register with the applist class which is like a client registry. When one of the components comes up, it registers with the applist class and that is how the applogic knows about them. If one of the forms from the E-mail client is selected and the form is launched from a separate html browser, the form registers itself with the applist. In turn, the applist notifies the applogic. The applogic keeps track of the current context for a user. It keeps track of the form and/or process for a given user, so that it would know what instance of process that it has to go to get the attributes for.

When a form is selected, an HTML form is automatically generated with functionality embedded in it. Once the form is generated, connectivity to the server happens without the user having to do anything further. A generated HTML form contains a smart embedded applet. Any html editor or any browser can bring up this form without the Java applet interfering with any of the form functionality. When the HTML form is brought up, the applet is able to go to the web server, connect to a process and connect to an activity inside the process so that the workflow system knows what data is being entered by whom at what point anywhere in the world.

When the workflow system generates a form which has user attribute data, the workflow engine follows the connected process to its activities. Whenever the user bring up a form, the form's fields are available to the server engine and if the user were to enter any data or change data, the server engine would know it. The server engine packs the data and the workflow system knows who has done a read/write and who did what, all of which the workflow system does with pure html. The advantage of the workflow system using an outside published standard, i.e., HTML, is that functionality is provided without the user having to learn the internals of a proprietary tool that the user would have to learn in order to connect applications.

The workflow system lets the user specify the attributes which need to go on the forms. On the forms itself, there is the invisible form applet. The applet can figure out how to go to the server and get the information it requires to populate the form fields. And when it is done, it is able to output the information to the server.

When the form is displayed, the display of the form assumes the existence of the rest of the client. When the form comes up, it handshakes/registers with the applist and gets generated to applogic. Applogic sets the context for the form. The form knows what kind of element it will display, e.g. nametype, and the applogic provides the form with the process instance it refers to and relevant to which activity the form applies. Applogic provides the form the PIDx (process id) and AIDx (activity id). The form has an html address, but if the user goes to a browser and selects the URL from the form without any client object, the form will not be able to do anything. The thin client is equipped with all the machinery necessary for the form applet so it has the context for the process instance.

The workflow system provides the following predefined clients: Developer (Fat, Full) client, Simple client, Instantiation (New Process) client, E-mail (Thin) client, and workflow administrator. The workflow administrator provides authorization for activities and the workflow administrator user type is someone who has authority. The Developer client is comprised of the Simple client, the Instantiation client, and the E-mail client. The Developer client includes all the functionality of all the other clients. Every client function is offered by the Developer client. Subsets of the Developer client are offered by the other clients. The Developer client is used to create plan templates, instantiate processes, and access and respond to workitems. The Developer client user type is a process designer or personnel responsible for designing and implementing processes. The Simple client is used to access and respond to workitems and to occasionally instantiate processes. The Simple client enables the end user to retrieve work list and fill forms and view/edit attachments associated with assigned activities. The Simple client user type is personnel responsible for implementing and participating in processes. The Instantiation client enables the casual user to browse the public workflow plans and create new process instances. The Instantiation client user type is personnel responsible for implementing new processes. The E-mail client is used to respond to workitems. The E-mail client is a URL launch-able client that provides a view of a single assigned activity. The E-mail user type is an infrequent user responsible for carrying out assigned tasks only.

The workflow system provides collaborative workflow for "online, real-time" users. The workflow system was designed for workgroup participation that involves collaborative effort to complete a task or a process. The participants in this process tend to be online (feathered) and work on tasks in real-time. The workflow system accommodates these users with two different types of browser based clients: a Developer Client and a Simple Client.

Figure 8:
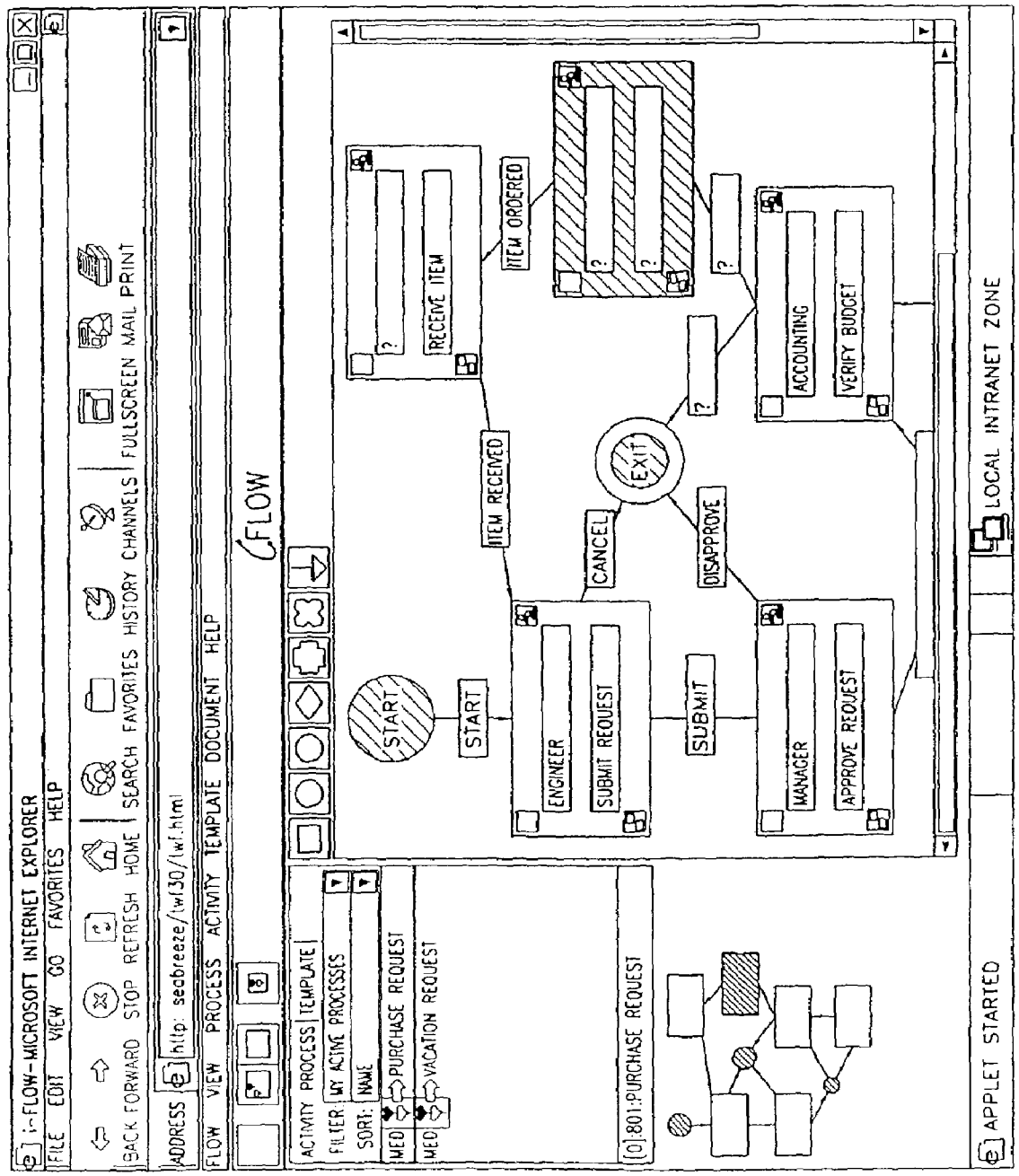
FIG. 8 shows a screen display of the web-based Developer Client.

The Developer client, which contains an intuitive graphical designer, is used to define a process plan in the workflow system. FIG. 8 shows a screen display of the web-based Developer Client. The Developer Client provides a rich development framework where the attributes of a workflow (such as activities, participants, and forms) can be defined. Once defined (created), the plan is stored as a "process template" and can be modified or initiated as a process. Although it is primarily used for process definition, the Developer Client also enables users to participate in active processes because the process can be initiated (started) and edited—even during execution. Thus, the Developer Client allows users to work online in real-time (tethered users). Only the Developer Client can define and/or modify a plan/template. Via the Developer Client, Web-based forms can easily be created using a simple internal form editor/generator. Forms can also be customized in the development environment of popular third-party Web authoring tools. The Developer Client enables: viewing and editing of attachments which supports check-in and check-out; circulation of "master copy" of attachments—many read, one write; creation of plans with point and click functionality; prevention of multiple attachment copies of "change and merge"; and flexible process design which is not fixed or locked.

Figure 9:
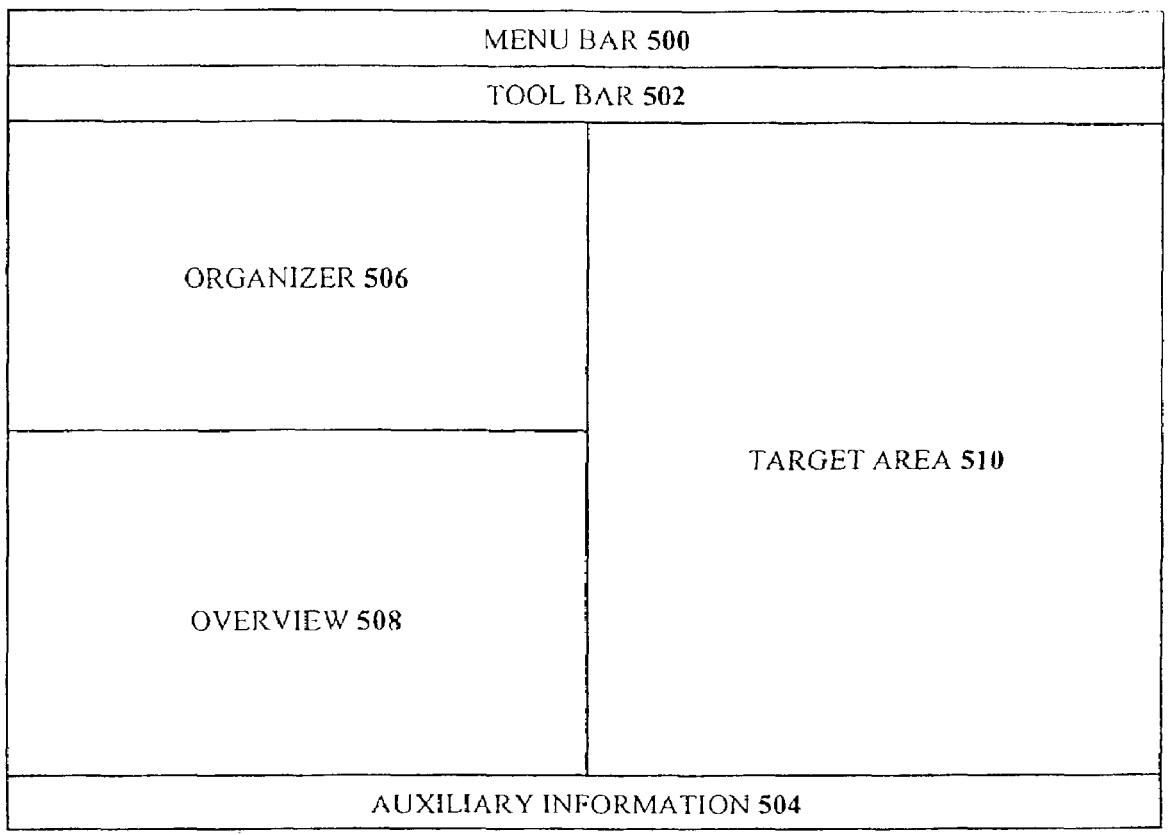
FIG. 9 shows the screen areas and names of the screen layout of the Developer client.

The Developer Client is divided into several interacting areas. FIG. 9 shows the screen areas and names of the screen layout of the Developer client. The screen layout shown in FIG. 9 is applicable only to the Developer Client.

The Menu Bar 500 provides menu commands for performing many application-wide functions. The menu items are shown in Table 1. The Toolbar 502 provides buttons as a quick alternative for performing the most frequently used menu commands. Table 2 shows the buttons that are displayed on the Toolbar. The Auxiliary Information Bar 504 which is also known as the Status Bar displays help tips and status information. The status information provides the status of the workflow system and/or items within the workflow system.

The Organizer 506 is an interface of objects providing support for selection update within the Organizer UI component. The Organizer area is a file cabinet for process templates, processes, and activities. With the Organizer, the user can filter cabinet drawers so that only those items which satisfy a specified criteria are displayed. Items can be sorted in a way that is meaningful to the user. When the user selects an item in the Organizer, the Overview Area and Target Area are populated with information relevant to that item. The Organizer uses color and icons to visually communicate many useful details. The activities in the Organizer is the same as the activities in the Simple Client.

The Overview area 508 displays a granular, miniature illustration (thumbnail) of the workflow for the process/template which is selected in the Organizer and displays full-scale in the Target Area. This allows the user to see at-a-glance activity types and relationships of activities within a process. For processes, the user can also see at-a-glance the status of the activities within the process. In the thumbnail view, color identifies the completion status of an activity.

The Target Area 510 is used for multiple purposes. The Target Area is where you respond to an activity or view/modify the characteristics of a process/template. The information displayed in this area is controlled by selections the user makes in the Organizer or Overview Area. The user can view two types of information: activity-specific information (also known as Detailed View) and process/template information (also known as Graphical View) such as attributes and workflow. Activity-specific information is displayed to see the details about an activity and to respond to an activity. The user can display activity information by selecting an activity in the Activity List. When an activity is selected, a workitem view is displayed in the Target Area. That workitem view is a detailed view and is exactly the same as the workitem view in the e-mail client. The detailed workitem view is a detailed view of the workitem regardless of the layout of the display. The elements are the same. The elements of the workitem view are some activity and process attributes, attachment lists, forms, and controls that help to add and choose attachments. The process/template workflow is displayed to graphically see the relationship of activities within a process/template and to modify the process's/template's characteristics. The usage of color in the workflow has the same meaning as color in the Organizer and Overview Area. The user can display a workflow by selecting a process/template in the Process/Template List or by selecting an activity in the Activity List and clicking Graphical View. To expand the size of the Target Area, select the View menu Heighten Canvas or Widen Canvas menu option. This expands the scrollable area.

The primary activity that a typical, every-day user will be engaged in is participating in a process once the process has been designed and implemented. Webster's dictionary defines a process as the "course, steps, or methods toward a desired result". Processes are modeled in the workflow system with flowchart-like diagrams. A process is a dynamic entity which is defined by a description of the tasks (activities) which must be performed, the sequence in which the tasks may be performed, who can perform the tasks, and the artifacts (documents and forms) required to complete the process. All underway processes are listed in the Process List.

Figure 10:
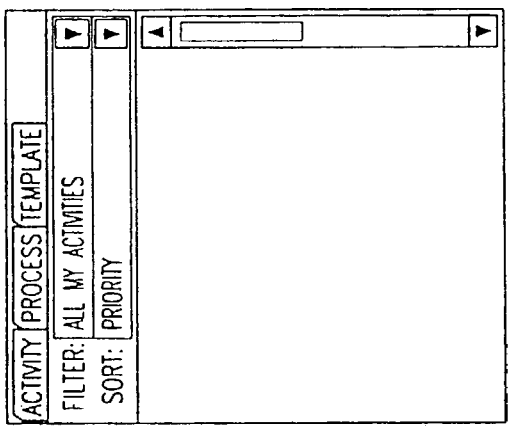
FIG. 10 illustrates the Universal Activity List.

Flexibility can be built into a process by providing process users multiple options for a task. When an activity is ready to be performed, it appears in the Universal Activity (To-Do) list in the Organizer so that anyone can see its status. The Universal Activity List (or more simply, the Activity List) keeps track of all activities in all processes and their status. FIG. 10 illustrates the Universal Activity List. A purchase order request is a typical business process which the workflow system is ideally suited to model.

There are several things which a user can do with processes. A user can sort and filter the list of processes, view the workflow for a process, view the properties for a process, associate a document with a process, and view the history of a process. Sorting processes arranges them in a specified order. Filtering processes displays only those processes which satisfy a specified characteristic. To sort processes, click the Sort drop-down list and select the desired sort option. To filter processes, click the Filter drop-down list and select the desired characteristic. "My . . . Processes" refers to those processes which the user started. ". . . Active Processes" refers to those processes which contain an active activity.

Figure 11:
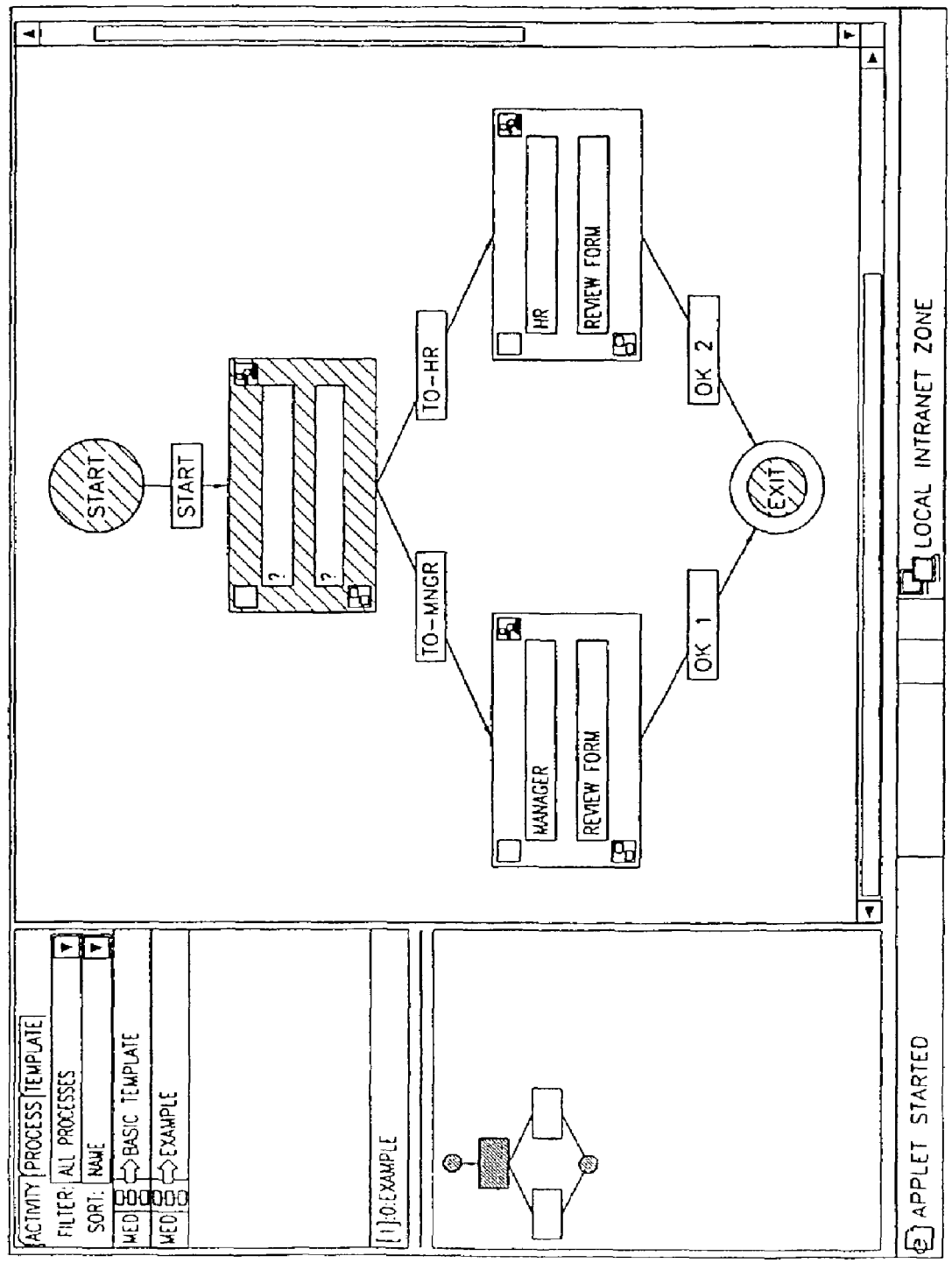
FIG. 11 shows a workflow process in the right frame of a screen display.

To view a process, the process is selected in the Process List in the Organizer. The workflow for the process is displayed in the Target Area, and a thumbnail view of the same workflow is displayed in the Overview Area. FIG. 11 shows a workflow process in the right frame of a screen display.

Once a process is displayed, the process's properties can be viewed. With the exception of Attachments, the process properties are derived from the process's template. Only attachments may be modified for a process. Attachments are described in the next part of this section. The Process menu Properties command is selected to view process properties.

A document may be associated with a process at any time. A document is any computer file. Unlike forms, documents are typically unstructured and do not have links with other data repositories. Once a document is associated with a process, it is an attachment and is available to all process participants. A viewer of an attachment must have the appropriate tools and/or environment set to open the attachment. Documents may only be associated with running processes, not templates. Though attachments are accessed from an activity, they are not tied to a specific activity. To dissociate a document from a process, click Remove. This will remove the association, not the document itself.

Process history includes the date and time the process was started and by whom, and the date and time an activity was completed, the activity's internal id, the action taken for the activity, and by whom. If an activity was performed automatically by the workflow system then "process" is displayed in the Responsible column. To display process history, the user selects the process in the Process List and selects the Process menu History command.

There are several things which a user can do with activities. The user can sort and filter the list of activities, view an activity description, open a form or attachment, check-in an attachment which was opened for editing purposes, specify the application to use to open an attachment, and respond to an activity. Sorting activities arranges activities in a specified order. Filtering activities displays only those activities which satisfy a specified characteristic. To sort activities, the user clicks the Sort choice button and selects the desired sort option. To filter activities, the user clicks the Filter choice button and selects the desired characteristic.

To view activity details, the user selects the activity in the Activity List in the Organizer. The activity information shown in the Target Area includes the name of the activity, the person who has responsibility for this activity (more than one person may be assigned responsibility—in this case, there is a separate activity in the Activity List for each assignee), the person who initiated the process, and the description of the activity.

To open a form:
1. If the activity's detailed description is not already displayed, display it.
2. Click Select Form () and select the form to open.

Changes which are made to fields are observable to other process participants when the form is closed.

There are several ways to open an attachment. The user must have the application which was used to create the attachment in order to open it. In addition, the application-file extension association must be defined. The user may open an attachment for viewing only from the activity's detailed view by displaying the activity's detailed information if it is not already displayed and clicking Select Attachment () and selecting the attachment to open.

The user may open an attachment for viewing or editing from the process's graphical view by: (1) Displaying the process's workflow if it is not already displayed. (2) Selecting the Process menu Properties command. (3) Selecting the Attachments tab. (4) Highlighting the attachment in the Current Attachments list. (5) Clicking View to open the attachment for viewing only. Click Edit to open the attachment to make modifications to it. Only one person may edit an attachment at a time; however, any number of people can view an attachment. If the user opens an attachment for editing, the user must remember to check it in when he is done so that others may edit it if necessary. The user must save attachments to their original name in order for changes to be reflected in the attachment.

If the user opens an attachment for editing, no one else will be able to edit the attachment or see the user's changes until the user checks it back in. An attachment is checked-in by: (1) Selecting the Document menu Check in command. (2) Selecting the attachment to check in. The Path field is populated with the location where the attachment will be stored and should not be changed. (3) Clicking Check In. (4) Clicking Close.

In order for the workflow system to know what application to use to open an attachment, an application-filetype extension association must be made. The document extension is the characters in a filename following the ".". Based on the specified association, the workflow system will open all documents with a given extension with the specified application.

An association is defined by: (1) Selecting the Document menu Associations command. (2) Entering the type of the document in the Type field (for example, Word). (3) Entering the filename extension for this type of document in the Ext field (for example, doc). If a document type has more than one possible extension, enter the extensions separated by spaces (for example, html). (4) Enter in the Program field, or click Browse and select, the entire path name of the program to use to open documents of this type. (5) Clicking Add. (6) Clicking Close to close the Document Association dialog box. An association is removed by selecting it in the list and clicking Remove.

The user may respond to an activity assignment by acting on the activity. This advances the process state to the next activity in the process. Acting on an activity involves: (1) displaying the activity detail information if it is not already displayed; (2) taking the steps necessary to perform the activity. This may include filling out forms, associating an attachment with the process, or modifying an already associated attachment; and (3) clicking the button (or selecting the option) at the bottom of the Target Area which reflects the action to be taken. The next logical activities in the process are activated and appear in the Activity List.

The User Profile contains the user's personal preferences. The user can set whether he wants to be notified by e-mail when an activity is assigned to him. In addition, the user can set the default save directory in the (DMS). This is the directory that the (DMS) is opened to whenever the user adds a document to the (DMS). Requesting E-mail notification involves: (1) Selecting the File menu User Profile command, selecting the Notification checkbox, and (3) entering the complete E-mail address in the E-mail field and Clicking OK. Setting up a user's default (DMS) directory involves: (1) Selecting the File menu User Profile command, (2) selecting the Document Management tab, (3) entering or Browsing for the default (DMS) directory, and (4) Clicking OK.

Color is used in the Organizer, Overview Area, and Target Area to communicate status and type information. The following colors for activities have the prescribed meanings:
INSERT GRAPHIC 12 (blue)—activity has been completed
INSERT GRAPHIC 13 (aqua)—either the activity is pending or it is a template activity
INSERT GRAPHIC 14 (green)—activity is the current one The color shade may be slightly different on different computers.

Special icons are used in the Process List, Template List, and Activity List of the Organizer to communicate useful information. Table 3 shows the special icons. Designing and implementing processes is an infrequent activity which will be done by someone who has a sound understanding of the existing manual process. Typically, the person will have given some thought to how best to redesign the process so that it can be optimized when implemented by the workflow system. This activity may be performed collaboratively by knowledge workers.

Templates are reusable process definitions. They contain all the information which a process contains, but they are not active. They are static entities which are associated with processes to define the behavior and properties of the process. A process can be thought of as a running template. As soon as a process is created, it is running and the first activity in the process appears in the Universal Activity List (provided the filter is not set to exclude it). The process's template defines which activities become active next, based on the response to the previous activity. A process/template is defined by 2 key characteristics: (1) activities, and (2) flow control.

Figure 12:
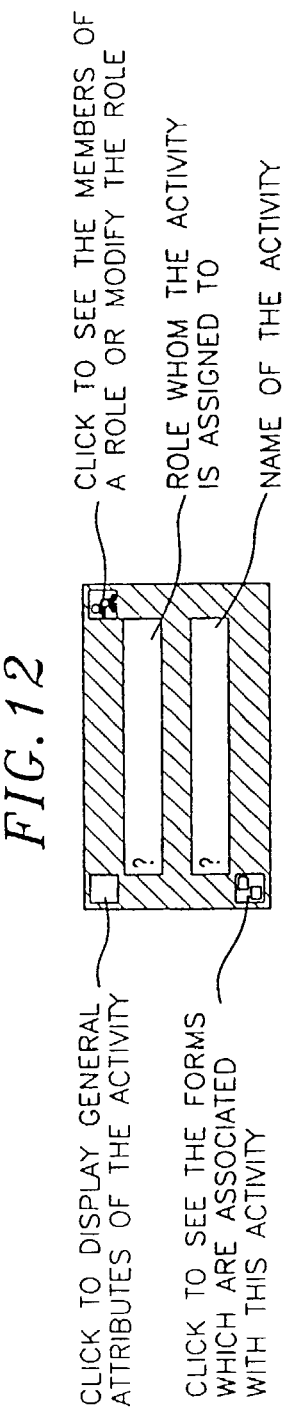
FIG. 12 shows the graphical representation of activities.

Activities are the building blocks of a process model. They define the tasks in a process as well as forms associated with the task and the personnel assigned to perform the task. When an activity is in progress, the activity is in an active state and will not be deactivated until a person assigned to the activity responds to it. An activity is used to model a task which requires human action or decision-making. Activities are represented graphically in a workflow by a rectangular node as shown in FIG. 12.

There are several different flow operators which control the sequence/timing of activities. Each operator is represented graphically by a distinct symbol. With the exception of arrows, this symbol is referred to as a node. The operators include, but are not limited to those shown in table 4. Other predefined nodes include the Subplan and the Split Activity nodes.

In the preferred embodiment, templates are created from scratch by: (1) Being in the Graphical View (i.e. either the Process List or Template List is displayed). (2) Selecting the Template menu New command. (3) Defining the workflow for the template (The Target Area Toolbar is displayed so that the workflow may be defined.). (4) Defining general descriptive attributes for the template. (5) Setting the owner for processes created from this template. (6) Defining the data items (user-defined attributes) available for forms. (7) Creating forms and associating them with activities or the Start node. (8) Defining the activity nodes' characteristics. (9) Defining the OR nodes' characteristics provided that there are any OR nodes. (10) Defining the AND nodes' characteristics provided that there are any AND nodes. (11) Defining the conditional nodes' characteristics provided that there are any conditional nodes. (12) After creating the template, selecting the Template menu Save command and entering a name and description for the template. Steps 4-11 may be performed in any order as long as step 6 is done prior to steps 7 and 11.

A template creator may set and modify any template property. However, the template creator may not modify template properties once the template has been used to start a process. In addition, the template creator may not modify a template which is already being edited by someone else. To make changes to an existing template, the edit mode is entered by selecting the Template menu Edit command, changes are made, and the template is saved. The properties of a process are derived from its template but may not be modified. The following properties apply to processes and templates:

Workflow—sequence of activities in the template/process

General attributes—name, title, and description of template/process

Figure 13:
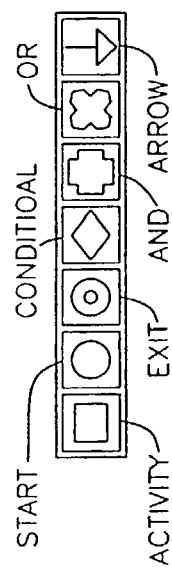
FIG. 13 shows the Target Area Toolbar which is used to place nodes and arrows.

Owner—(applies to templates only)—the owner of a template; by default, the owner of a process is the owner of the template which the process was created from Data items—data which can be displayed in forms Activity node attributes—description and assignment of the activity OR node attributes—description and behavior of an OR node AND node attributes—description and behavior of an AND node Conditional node attributes—description and behavior of a conditional node Forms—forms which are used to complete an activity To modify a workflow, the workflow for the template must be displayed. The Target Area Toolbar is used to place nodes and arrows and is shown in FIG. 13. To add a node: (1) Select the Template menu Edit command if the Target Area Toolbar is not seen. (2) Click in the Toolbar, the node which is to be added. (3) Click on a blank area in the Target Area where the node is to be placed. (4) Repeat step 3 for each node to be placed. To add an arrow: (1) Select the Template menu Edit command if the Target Area Node Toolbar is not seen. (2) Click in the Toolbar the arrow operator (↓). (3) Click on a non-field area of the node which the arrow is to originate from and, without releasing the mouse button, drag the arrow's endpoint to the destination node. An arrow must connect two nodes. An arrow that does not connect two nodes cannot be drawn. (4) Click in the arrow's name field and give it a unique name which describes the user action which will result in the arrow being taken. Only arrows which originate from activity nodes require a descriptive name. The other node types do not require a user action. (5) Repeat step 3 for each arrow to be placed.

To move a node or arrow, with that of the buttons in the Node Toolbar depressed, the node or arrow is clicked and dragged to the desired location. When moving nodes, be sure to click in a non-field area. When dragging nodes, connected arrows will automatically be readjusted. You may not drag an arrow such that either endpoint is not connected to a node.

General attributes of a template are defined by: (1) Displaying the workflow for the template. (2) Selecting the Template menu Properties command. (3) Entering the Name, Title, and Description of the template on the General tab of the displayed Properties dialog box. (4) Clicking OK. Setting the owner of a template is accomplished by: (1) Displaying the workflow for the template. (2) Selecting the Template menu Properties command. (3) Selecting the Owner tab. (4) Selecting the Role checkbox, click, selecting the desired role, and clicking OK.

Roles are equivalent to groups in NT and Recipient containers in Exchange. For details on how to create a group/container, the Directory Service documentation should be consulted. The list of available roles are all the groups/containers which are defined in the Directory Service. When a role is selected, the members of the role are displayed in the right pane.

Data items are attributes associated with a process which you wish to track by putting on a form. For example, a purchase requisition process might have the attribute cost. A process participant can open the form to set a value for cost.

To specify the set of data items: (1) Displaying the workflow for the template. (2) Selecting the Template menu Properties command. (3) Selecting the User Defined Attributes tab. (4) Clicking Add. (5) Modifying the name of the data item. (6) Selecting the data type for the data item. (7) Entering an initial default value for the data item if the field for this data item is to be automatically filled when forms containing this data item are displayed. (8) Repeating steps 4-7 for each data item. (9) For the last field modified, pressing the <Enter> key or clicking in another field so that the change is accepted. (10) Clicking OK.

Scripts are defined by: (1) Making sure that the workflow for the template/process is displayed and being in editing mode. (2) Clicking the Properties button ( ) on any node to display properties of the template. (3) Selecting the Scripts tab. (4) In the Init Script field, entering the JavaScript to execute when a process is first created from this template. (5) In the Commit Script field, entering the JavaScript to execute when the process is completed. (6) Clicking OK. (7) Selecting the Template menu Save command when the modifications are finished. In addition to the standard ECMA JavaScript commands, the workflow system provides an additional set of JavaScript commands for retrieving information from the Server.

Activity node attributes are defined by: (1) Making sure that the workflow for the template is displayed. (2) Entering the Assignee (Role) for the activity in the top field of the activity node. Alternatively, the Assignee can be set as described in step 6 below. The Assignee must be a group defined in the Directory Service. Roles are equivalent to groups in NT and Recipient containers in Exchange. Directory Service documentation should be consulted for details on how to create a group/container. (3) Entering the name of the activity in the bottom field of the activity node. (4) Clicking the Properties button ( ) on the activity node. (5) On the General tab, entering the Name, Title, and Description for the activity. (6) If the Assignee for the activity was not set in step 2 above, clicking the Assignee tab, selecting the Assignee checkbox, selecting the desired role, and clicking OK. The list of available roles are all the groups/containers which are defined in the Directory Service. When a role is selected, the members of the role are displayed in the right pane. (7) On the Script tab, entering a Body Script to execute when the activity becomes active and an Epilogue Script to execute when a user responds to the activity OR click . . . to select scripts stored in the (DMS). (8) Clicking OK.

OR node attributes are defined by: (1) Making sure that the workflow for the template is displayed. (2) Clicking the Properties button ( ) on the OR node ( ). (3) Selecting the Properties tab and specifying a Name and Description for the node. (4) Selecting the Script tab and entering the script to be executed when the OR node is completed. (5) Clicking OK. AND node attributes are defined by: (1) Making sure that the workflow for the template is displayed. (2) Clicking the Properties button ( ) on the AND node ( ). (3) Selecting the Properties tab and specify a Name and Description for the node. (4) Selecting the Script tab and entering the script to be executed when the AND node is completed. (5) Clicking OK.

Conditional node attributes are defined by: (1) Making sure that the workflow for the template is displayed. (2) Clicking the Properties button ( ) on the conditional node ( ). (3) Selecting the Decisions tab. (4) Selecting the data item which will be evaluated. The data item options are those that were specified in the User Defined Attributes page of the Template Properties dialog box. (5) For each arrow which originates from the conditional node specifying the value to compare the data item to and selecting the relation which must be true in order for the arrow to be taken. (6) Selecting the radio button which identifies the default arrow. (7) This arrow will be taken if none of the expressions are true. (8) The order of the expressions in the list can be rearranged by highlighting the expression and clicking Up or Down. To execute a script when the conditional node is activated or completed, the Script tab is selected and the script is entered in the Prolog field or Epilog field, respectively. (9) Clicking OK.

Forms are defined and generated using the workflow system. They are structured, field-based HTML files whose layout may be modified using any HTML Authoring Tool or by modifying the HTML code itself. They serve as an artifact for data exchange between the workflow system and structured data repositories. Forms are created and associated with activities or the Start node during template creation. This makes them available to process participants.

A form is created by: (1) Defining the data items for the template if it has not been done already. (2) Making sure that the workflow for the template is displayed. (3) Clicking the Form button ( ) on the activity node with which the form is to be associated. A new form cannot be created from the Start node. Only an existing form can be associated with the Start node. (4) Clicking Create New. A dialog box to specify the contents of the form is displayed. By default, all user-defined data items will appear in the form. (5) For each data item, if the user does not want a data item to appear on the form, the user deselects the data item's Use in Form checkbox. Otherwise, the user specifies the form label for the data item. After the last label is modified, the user either presses the <Enter> key or clicks in another field so that the change is accepted. (6) If the form is to be given a more meaningful name (which will be used by the process participant to open the form from the Detail View) than the filename, then the user enters that name in the Form Title field. If the Form Title field is not filled in, then the form's filename will be used for the form's name. (7) Specify in the Form Path field the path for the FormsRepository and a filename under which to save the form in the Document Management System. Alternatively, the tree structure can be browsed for a location to place the form. If Exchange is being used for as the Directory Service, the form will not be able to saved to the FormsRepository path. In this case, the form is saved to the top-level folder which is displayed. Before a process participant can open the form, an Exchange Client must be used to manually copy the form from the Exchange directory to the above-specified FormsRepository path. (8) Clicking Generate Form. The form is created such that the fields are in a single column. The appearance of the form can be customized using any HTML Editor and clicking OK.

A form is associated with an activity by: (1) Making sure that the workflow for the template is displayed. (2) Clicking the Form button (⌘) on the activity node with which to associate a form; however, there is an exception for the Start node. For the Start node, the node is selected and the Activity menu Properties command is selected. When a new process is started, the form will be immediately opened so that the process initiator can fill out the form. (3) Clicking Browse to browse the Document Management System for the form. (4) Entering in the Path field the location of the form. Alternatively, the tree can be traversed to the form location. (5) If the form is to be given a more meaningful name (which will be used by the process participant to open the form from the Detail View) than the filename, then that name is entered in the Title field. (6) Clicking OK to accept the entries and closing the Browse dialog box. (7) Clicking OK to accept the new association and closing the Activity Instance Properties dialog box. To dissociate a form from an activity or the Start node, click Remove. This will remove the association, not the form itself.

A new process is created and started by: (1) Clicking the Template tab in the Organizer to display a list of process templates. (2) Selecting the template to be used for the new process and clicking New Process (⌘) in the Toolbar. (3) If a form was associated with the Start node in the process's template, the form will open upon which the form can be filled out and submitted. The new process can be seen by selecting the Process tab and highlighting the new process. The new process has the same name as the template, but will not be seen if a filter is set to exclude it. The new process is displayed in the Target Area. The current active activities in the process are highlighted by greenish-colored nodes and will show up in the Activity List (provided that a filter is not set to exclude them) when the Activity tab is selected.

Figure 14:
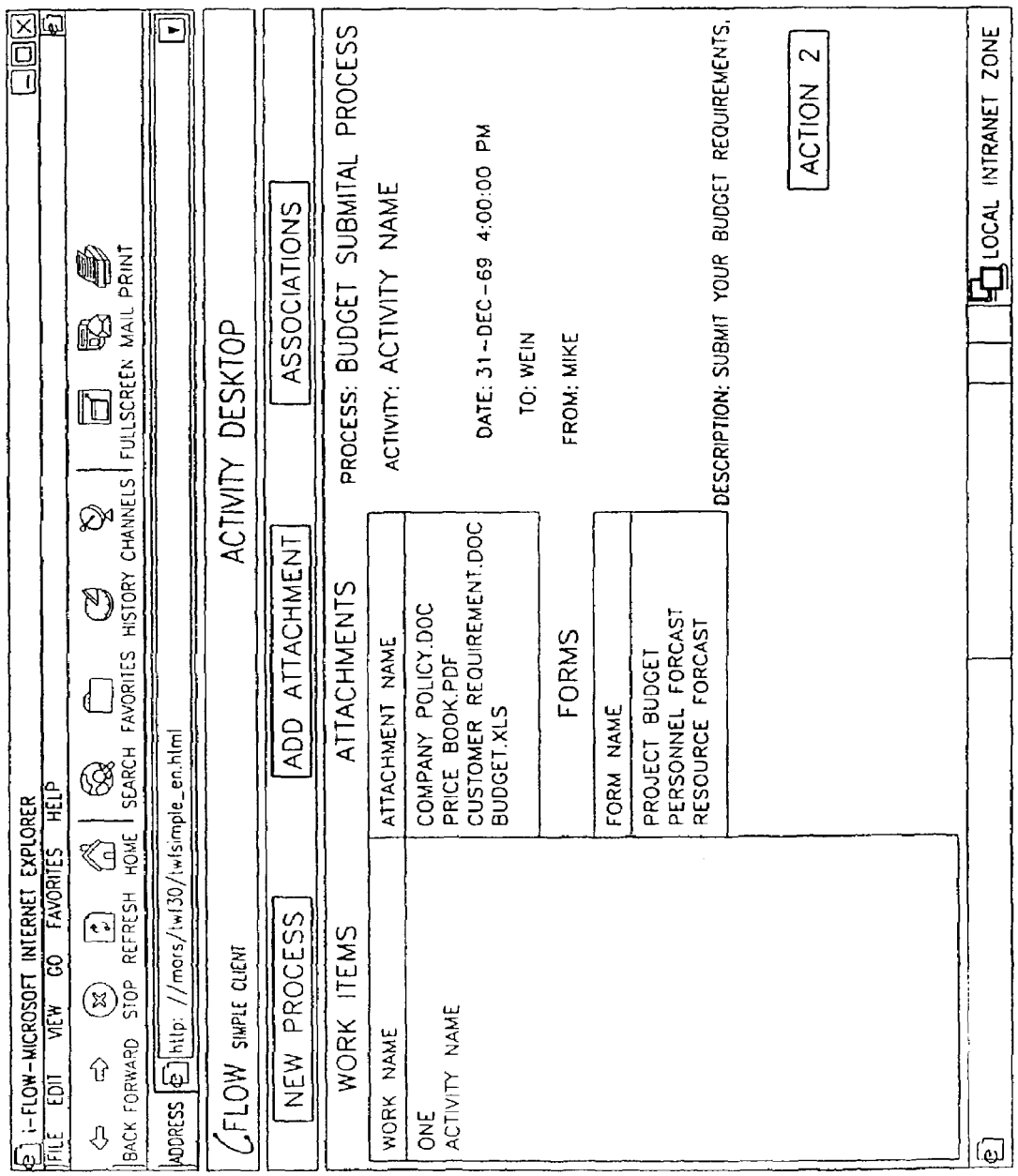
FIG. 14 shows a screen display of the web-based Simple client.

For those users who frequently participate in a process but do not define processes, the workflow system provides a Simple Client. FIG. 14 shows a screen display of the web-based Simple client. The Simple Client was designed for users who participate in tasks online and in real-time. The Simple Client is for real-time, online task/activity participation on a frequent basis. The E-mail client and the instantiation client are components of the Simple client. The Simple Client combines the features available in the E-mail Client and the Instantiation Client. The Simple Client allows users to participate in a process by enabling users to instantiate (start) a process, and view, edit, add and attach documents and fill-in forms, as users address their assigned tasks from a worklist. The Simple Client provides a simple way to access workitems and start new processes without having to bother with superfluous information.

Figure 15:
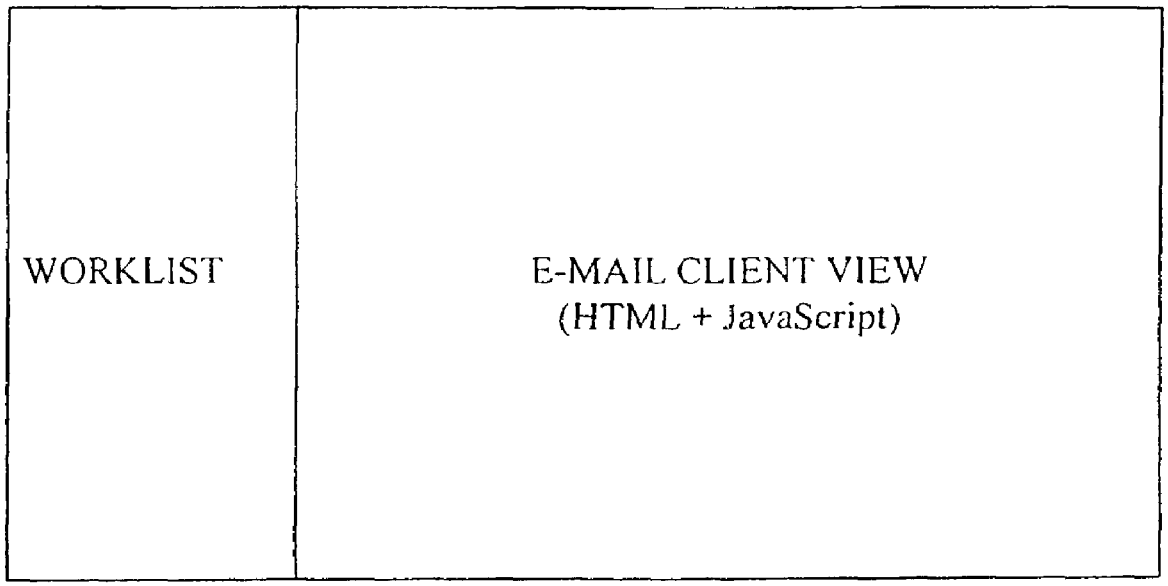
FIG. 15 shows the Simple Client view as two elemental frames.

The simple client is basically two elements, i.e., two frames. FIG. 15 shows the Simple Client view as two elemental frames. A frame is a place where an html page can be displayed. The left frame is the worklist, the basic activity that is assigned to the user. The right frame contains the E-mail client. Thus, the simple client is comprised of a detailed view (right frame) along with a worklist (left frame) which refers to activities assigned to the user and still not complete. The Simple Client includes the following elements of the full client (which was shown in FIG. 6): the Application Logic (AppLogic) 66, the WorkFlow (WF) Manager Model 68, the Form Model 70, the Workitem Model 71, the Process Model 72, and the Template Model 74. The visual applet is the worklist.

When a user double-clicks the URL, the workflow system comes back with a request for a login for a password. When an icon is selected from the worklist, it invokes a web page into the frame of the detailed view. The method of selecting the URL for the E-mail client uses the fact that the URL was hard-coded inside the e-mail and when a user double-clicks on it, the web page is launched. In the case of the simple client, when a user selects an element from the activity list, the effect is that a detailed view web page that contains specific items for a particular activity is launched.

To invoke the Simple Client, the URL for the Simple Client is entered in the web browser, for example, "http://<i-Flow Server host name>/<http document directory, which is twf30 if default accepted >/twfsimple_en.html?uid=<username>%server=<Server Name>."

The Simple Client-interface uses the same interface as the E-mail Client with two additions: (1) the workitem list, and (2) the New Process button. A workitem that is to be reviewed or worked on is selected from the workitem list. The workitem information is presented in precisely the same way as for the E-mail Client. All features available in the E-mail Client are available in the Simple Client. Clicking the New Process button will invoke the Instantiation Client to start a new process.

The E-mail client is built from both HTML and JavaScript. In FIG. 6, the Applogic, the WFManager Model, the Workitem Model, the Form Model, the Process Model, and the Template Model are part of the simple client. The visual applet is the worklist.

The workflow system is ideal for internal administrative processes such as purchase requisitions, expense reporting, call tracking, or web commerce. Process templates can easily be created by non-technical personnel and changed on-the-fly, in an ad hoc fashion, enabling the automated workflow process to evolve along with the actual process.

Administrative tasks are often completed on more of an occasional basis by a wide variety of users. These users include those that have a remote, low-bandwidth connection, perhaps through a modem (referred to as a "casual" user), and those who work primarily through e-mail (non-tethered user). To accommodate these types of users, the workflow system provides two easy-to-use Web-based clients: the Instantiation Client and the E-mail Client.

Once a process template is created (using the Developer Client), casual users can participate through either of the two browser based clients: an Instantiation Client or an E-mail Client. Both the Instantiation Client and the E-mail Client are primarily HTML clients for remote users. The Instantiation Client provides e-mail only users with a method to instantiate (initiate) a new process from predefined templates through an established URL address. The E-mail Client enables non-tethered users to receive their work items, and related documents and allows them to complete their tasks all through a Web client via e-mail (through SMTP or wireless SMS). Thus, remote users can also participate in a process and viewing and editing of attached documents and forms. Participation is by anonymous and external users.

With these clients, tasks can be assigned and routed directly to participants, eliminating the need for participants to check work assignments through an online worklist. Moreover, with the workflow system's intuitive browser-based clients, tasks can be completed by occasional participants in a more efficient manner since the interface is simple and easy to learn.

The Instantiation Client provides a simple way to quickly start new processes (for example, submit a vacation request) without having to bother with superfluous information. The instantiation client consists of a list of templates. On the right-hand side is a detailed view for a template, not an activity. The detailed view helps to set initial conditions for a new created process. Attachments which are added at the start of a process may be initialized. Forms may have to be filled. There is one button to start or cancel. Once the user says it is O.K. to start a process, a new instance of the process is created with the attachments that were added to it and the process attributes are initialized according to the values input into the forms. To invoke the Instantiation Client, the URL for the Instantiation Client is entered in the web browser, for example, "http://<i-Flow Server host name>/<http document directory, which is twf30 if default accepted >/twfinstantiation_en.html?uid=<username>%server= <Server Name>."

The only action that a user may do upon logging into the Instantiation Client is start new processes. This requires that the template for the process already exist. If there are no buttons in the Instantiation Client, then no templates exist. A new process can be started by: (1) Clicking the button for the template to instantiate. The name and the description of the template will appear in the right pane. (2) Clicking OK to start a process with the specified template. If a form was associated with the Start node in the process's template, the form will open. (3) Filling out the form and submitting it. The process is started and can be viewed using the Developer Client. The active activities can be seen in both the Full and Simple Client. If the assignee for active activities in the process has elected to receive e-mail notification, s/he can access the activity via the E-mail Client.

The E-mail Client is basically a web page which has an address which it can be launched from. The E-mail Client is built from both HTML and JavaScript. The E-mail Client is the smallest of the clients and it provides a simple way to quickly respond to task assignments without having to bother with superfluous information. The E-mail Client provides a workitem view of tasks that are assigned to the user. It has predefined items like description, date, and time etc. The E-mail Client has items specific to that task, like attachments and forms. The E-mail Client has the final decision that has to be made from a set of choices after completion of a task. In order to access the E-mail Client, the user must receive an e-mail notification from the workflow system. In order to receive notifications, the user must have elected this option in the Developer Client when setting up the user profile. The user will then only receive an e-mail when a task has been assigned to the user. Within the body of the e-mail message, there will be an HTTP link which when clicked invokes the E-mail Client. The E-mail client is surrounded by an HTML page. The E-mail client is invoked by a URL with a list of parameters (the null list is one option), e.g., "http://iflow/TW30/thinclient" is a URL to invoke the E-mail client without parameters. To invoke the E-mail client with parameters, the parameters ?PID=_&AID=_ would be added to the URL command line (PID representing the process identification and AID representing the activity identification. This is how to pass parameters to the E-mail client and bring up the E-mail client page. This http could be written in an e-mail message.

The E-mail client is real-time in the sense that it is connected directly to the server at the time an activity is being completed. The E-Mail Client does not use the store-and-forward paradigm to process a completed activity. The E-Mail Client delivers the URL for the user to get access to a particular activity, but when the activity is brought up, it is online connected to the server. Online means that the interactivity between the e-mail client and the server is done via CORBA in real-time. It is not using the store-and-forward paradigm. This is in contrast to a system where when you hit the completion button on an e-mail client and it is offline, then the information might be taken and put into an e-mail message and sent to the server and eventually the server gets it. In the workflow system, when a user hits O.K., it goes to the server in real-time.

Figure 16:
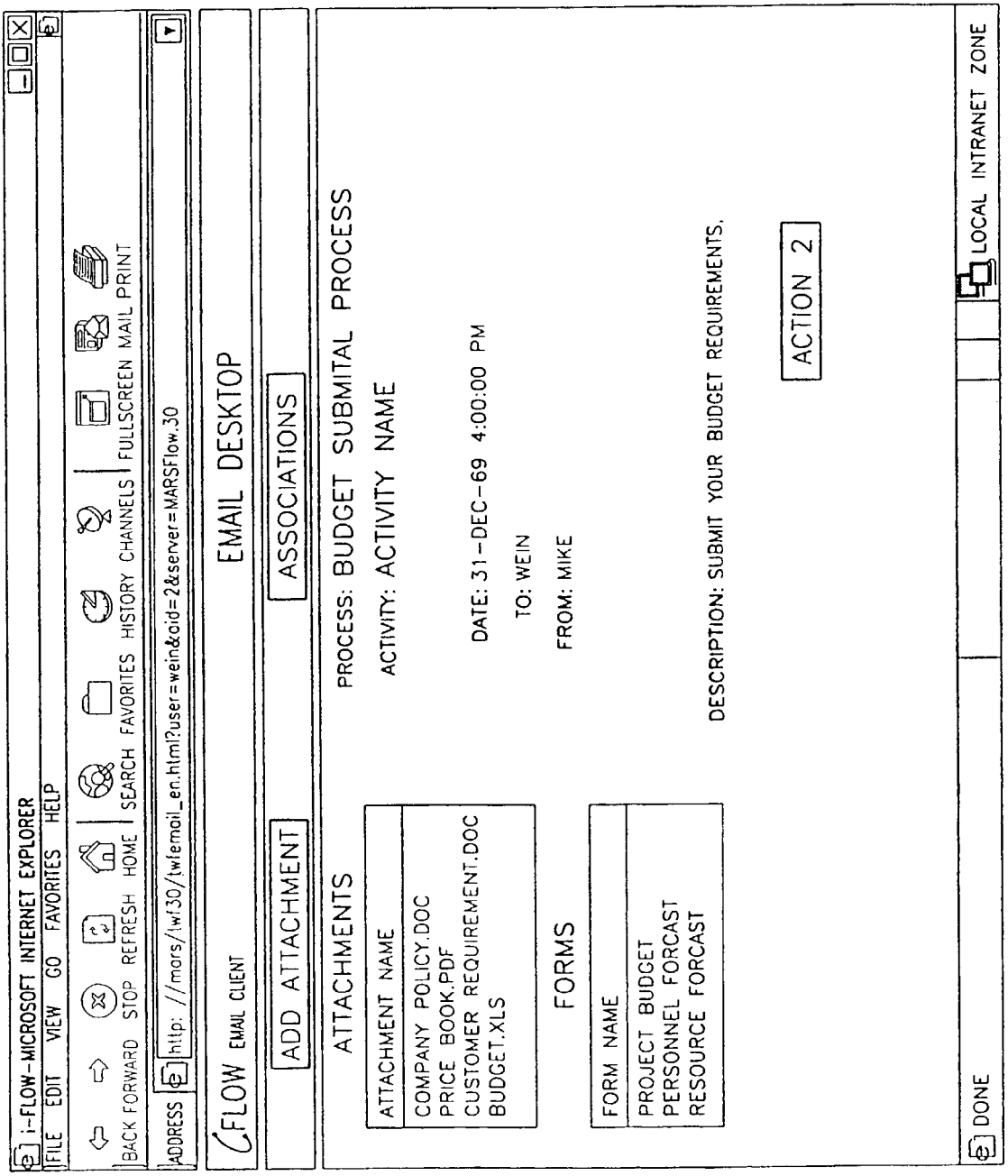
FIG. 16 illustrates the E-mail client interface.

Though the E-mail client interface appears different than the Developer Client, the functionality behind it is essentially a subset of the Developer Client's. With the E-mail Client, upon logging in the user can: respond to an activity, associate a document with a process, open a form or attachment associated with the activity, and specify the application to use to open an attachment. FIG. 16 illustrates the E-mail client interface.

An activity is responded to by modifying the necessary forms and attachments and clicking the button which represents the action to take for the activity. There is a separate button for each form associated with an activity. Clicking on a button opens an activities' corresponding form. There is a separate button for each attachment associated with the activity. New attachments can be added to an activity. Before an attachment can be opened, the application to use to open it must be specified (if it has not already been done with the workflow system Developer Client).

An attachment is opened by clicking on the button corresponding to the attachment. The attachment may be opened for viewing only or for modifying provided no one else has opened it for modifying. If the attachment does not open, it may be because the application to open it has not been specified. An application can be specified to open an attachment by: (1) Clicking Associations. (2) Entering the type of the document in the Type field (for example, Word). (3) Entering the filename extension for this type of document in the Ext field (for example, doc). If a document type has more than one possible extension, enter the extensions separated by spaces (for example, html). (4) Entering in the Program field, or clicking Browse and select, the entire path name of the program to use to open documents of this type. (5) Clicking Add. (6) Clicking Close to close the Document Association dialog box. An association is removed by selecting it in the list and clicking Remove.

The workflow system Software Development Kit (SDK) provides the interface for the model classes so the user can utilize them. The SDK also provides the specification of each of the UI components to enable the developer to integrate them with whatever application the developer may have. In addition to the UI components and model classes, the SDK provides the interface definition of the script adapter, the DD framework, Directory adapter, and the (DMS) adapter. The SDK provides the developer implementations of the Script adapter, DD framework, Directory adapter, and (DMS) adapter The (DMS) adapter has three implementations: Native NT, Exchange, and JDK. The Directory adapter also has three implementations: Native NT, Exchange, and LDAP.

Part of the SDK is the extensions that have been added to the JavaScript interpreter that allows users to write script commands that accesses the server. The script commands are predefined for the user so that they can access the process context.

The workflow system provides the developer with a framework for enabling the developer to add his own command extensions. The developer can develop a Java class that accesses any data resource or application outside the workflow system and the developer can access that Java class from within the scripting environment. The interface to the script allows the developer to incorporate different kinds of script adapters and different kinds of scripting languages.

The workflow system SDK is independent of the adapters used, thus allowing the Value Added Retailers (VARS) to use the SDK to develop clients independent of the adapters. The SDK enables developers to customize and extend workflow system functionality as well as to integrate the workflow system with third party products and tools. The SDK is Java-Bean based. The SDK includes Java Bean and Java Script components, and server adapter APIs. The Java Bean and Java Script components serve as building blocks available from a Visual Java Script pallet. All workflow system tools are assembled out of reusable beans as well as Java Script components. The components can be used as needed, enabling high client extensibility and customization. "Adapter Object" APIs are available on the server side. Server adapter APIs allow third parties to connect the workflow engine to the desired (DMS), Directory service, and Script interpreter. In the preferred embodiment, the APIs support the OMG's Workflow Management Facility standard. Server-side scripting extends functionality to additional components/applications.

One aspect of the SDK is that it implements model-view separation. The models handle multiple simultaneous presentations. When a user changes something in one of the presentations, it changes the model, which then notifies the rest of the presentations. The model classes, referred to as Java-Beans, lend themselves to scripting. Having them as Java-Beans, allows use them to be used as components which is another aspect of the SDK. Another aspect of the SDK is that it hides, conceals, CORBA idiosyncracies. The benefit is that the workflow system shields the people who are using the workflow system models from idiosyncracies regarding the transport layer between the client and the server.

In addition to the SDK, the workflow system provides different clients. The developer client is mandatory because without the developer client, the developer would not be able to design a process. Although the developer client is not part of the SDK, the SDK is of little use without the developer client because the developer client provides the input for a process definition. The significance of the developer client is that it lets the developer input the process definition. As part of the inputting of the process definition, the developer client helps generate the forms.

The developer client is built using building block components. Inside the developer client is the process designer tool which helps developers generate the forms and also lets developers to input the process definition to the server. The SDK components are used to construct the developer client as well as the other clients. The developer client, in contrast to the other clients, provides the input for the process definition to the engine and helps generate the forms. Applications can be written independent of any process design, but if a meaningful system is desired at the end of the development process, then the developer can input process definitions via the developer client.

The workflow system also has the administration client which is constructed from the same components that the developer client is constructed. Just as the developer client is required, the workflow system requires the administration client to be fully functional. This is in contrast to the simple and instantiation client which the workflow system does not necessarily need for the system to be fully functional.

In addition to providing the interfaces and implementations, the SDK provides the skeletons. In the preferred embodiment, the skeletons are provided in C++ as well as Java. Thus, developers do not need to have CORBA development tools in order to develop their own adapters.

Figure 17:
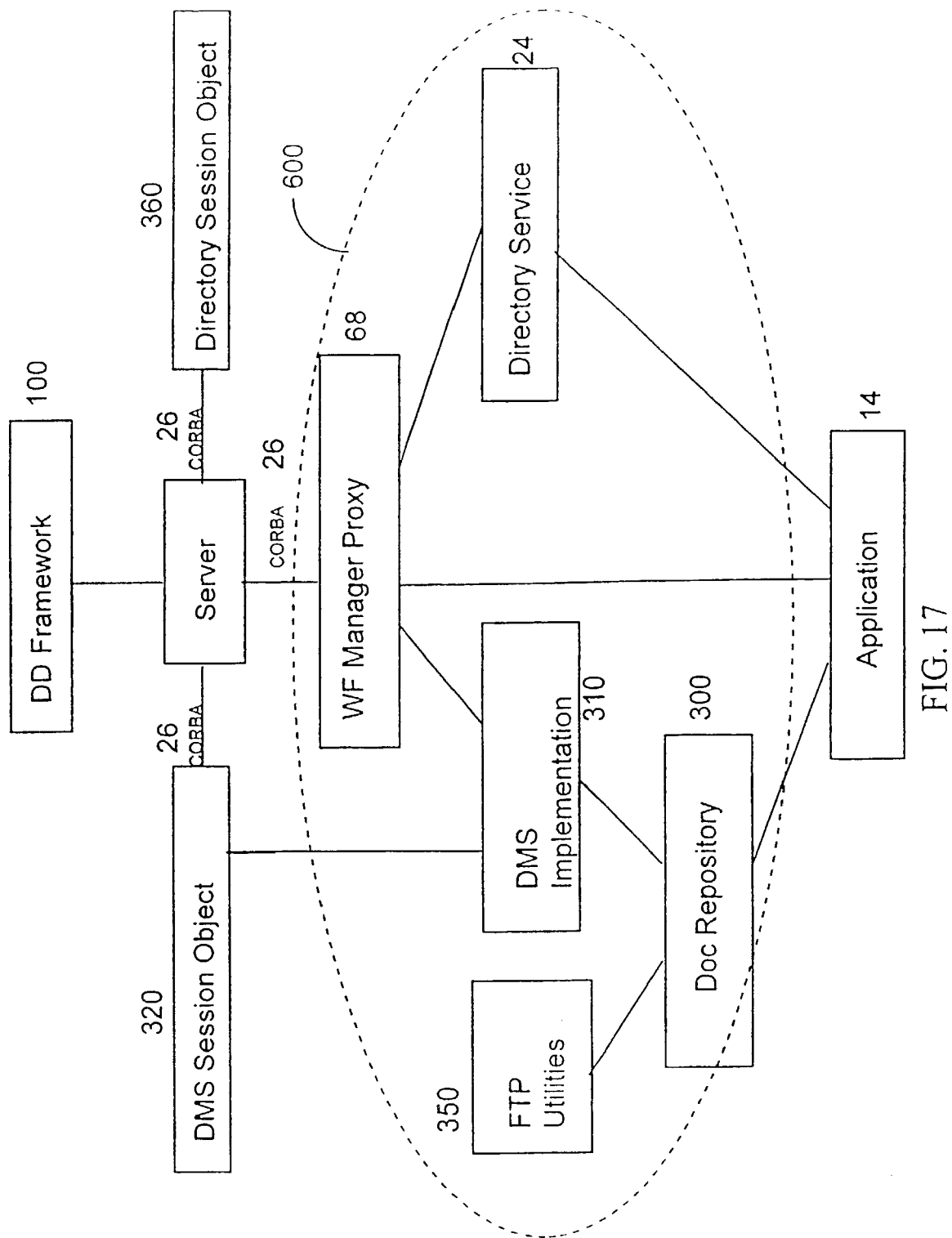
FIG. 17 shows the interaction between the application, the elements of the software development kit, and the (DMS) and (DS) objects.

FIG. 17 shows the interaction between the application 14, the elements of the software development kit 600, and the (DMS) 320 and DS objects 360. The SDK is comprised of the WF Manager Proxy 68, the Doc Repository 300, the (DMS) Implementation 310, the FTP utilities 350, and the Directory Service 24.

The workflow system has building block components which enables combining the building blocks to form any kind of client. Consequently, clients have flexibly replaceable components, thereby enabling the developer in creating workflow client applications. The workflow system client components lend themselves to be integrated and customized using a builder tool such as Visual Java Script.

Client model components are non-interactive Java beans. The purpose of the client model component is to encapsulate the state of client object as well as their interactions with the server via IIOP.

There are multiple client user interfaces for different types of users. The purpose of the client UI components is to provide the different components of the workflow system's user interface such as a worklist list user interface. These components will not be maintaining client objects or carry out interaction with the workflow system server.

The API will be provided as Java packages that contain the model beans that cover all interfaces to the workflow system server. This API will allow the developer to access and manipulate all aspects of the workflow system including its administration.

The open adapter APIs allow third parties to develop adapters to connect the workflow system engine to the desired (DMS) or DS. DS adapters are already provided for the NT User Registry, MS Exchange, and LDAP. (DMS) adapters are provided for the NT File System, MS Exchange, and JDK. The open adapter APIs are provided so that adapters which work with other systems can be developed. The CORBA IDL Specifications for each adapter interface is provided with the workflow software package as well as example code.

The Adapter API utilizes wide strings to represent unique characters in order to accommodate characters in different languages. 8-bit characters are sufficient to represent Latin and Arabic characters, but characters of other languages require more bits to represent them. Chinese characters require at least a double byte.

The Client API is provided as Java packages which contains model classes that cover all interfaces to the workflow system server. The Client API allows a developer to access and manipulate all aspects of the workflow system including its administration. Client bean API's can be used by the developer to build his own applications/tasks. The API enables developers to customize and extend workflow system functionality as well as to integrate the workflow system with third party products and tools. When Client bean APIs are used to build an application, the crux of the application is the workflow manager package. The workflow manager package contains bean to establish a connection to the Server and retrieve references to server-side objects. Client bean APIs can be used to perform such common tasks as: logging in to the workflow server; retrieving a work item, process, or process definition (templates); managing the Document Management System; and determining role membership. All workflow system tools may be developed from these classes as well as JavaScript components.

All kinds of workflow applications can be developed from the model classes. The user can use the classes and develop a Java application or the user can use the scripting that is available on the browser on the classes or the user may do a combination of the above, i.e., using the available browser scripting on the classes and developing a Java application.

Table 5 contains summaries of the packages in the workflow system Client. These packages contain classes and interfaces which have been made available to the developer. The completely qualified name for each package is COM.fujitsu.fsc.TWFlow. Client.<package name>.

The Process change control facility applies changes to all processes executing the same plan and provides a meaningful notification to involved users. The process change control facility provides users the ability to: suspend all processes executing a specified plan, change the plan, and apply changes (transmute) to all processes executing the modified plan while salvaging the data entered by the user.

As an alternative to the current organizer, an embodiment of the invention may provide a folder hierarchy which is a tree of folders. The tree of folders include personal folder sub-trees and shared folder sub-trees. The personal folder sub-tree contains: a folder for assigned tasks (derived/computed), owned processes (derived/computed), and Others. The folder for assigned tasks can be active or completed. The owned processes can be active or completed. Others allows the user to create a personal folder hierarchy where short cuts to processes, plans, and activities can be created. The Shared folder sub-tree which is managed by the workflow system administrator contains published plans. It also provides a subtree for the (DMS) and provides a sub-tree for servers.

A derived/computed folder has contents which are computed at run time using a filter (similar to a relational database query). Upon request of the folder by a user, a filter (query) is evaluated and the derived/computed results are sent to the user. After the initial request for a specified folder, any changes in the workflow system that meets the selection criteria specified by the filter, are proactively propagated to the requestor.

In another embodiment of the invention, processes may be displayed at a single-level and the user can sort and filter them. In yet another embodiment of the invention, the folder organization is associative and multidimensional and filters can be applied to the folders. The organizer is shown in the upper left-hand corner of FIG. 11. In addition to the activity, process, template tabs, the user has two controls that control how the lists are displayed i.e. filter and sort. The paradigm used is based on associative lists. A user specifies a filter and sorting order, much like Structured Query Language (SQL). In the preferred embodiment, the workflow system has the following user-provided filters for processes: MYactive, MyInactive, ALLactive, ALLinactive, and Everything. MYactive provides a list of all active user processes. My Inactive provides a list of all inactive user processes. ALLactive provides a list of all active processes whether or not they are the user's processes. ALLinactive provides a list of all inactive processes whether or not they are the user's processes. Everything provides a list of all processes, active or inactive.

In the preferred embodiment of the invention, the workflow system allows users to ask for the lists with proactive notification or without proactive notification meaning if a new process gets created that the user wants to know about, then with the proactive notification, the list gets updated, but without proactive notification, the list does not get updated.

The fill form fields are predefined set of fields that are generated by a process designer and are part of the user profile such as E-mail, address, title, etc.

The workflow system provides role resolution and mail notification for anonymous users (users who do not have an account in the directory) which allows the participation of users who can only be identified and notified of activity requests via E-mail. In this case the notion of role membership should be augmented to include E-mail address as a user identification.

TABLE 1

| Menu | Menu Command | Description |
|---|---|---|
| Flow | Login | Use to connect to a workflow system Server |
| | Logout | Use to disconnect from the workflow system Server |
| | User Profile | Use to display the dialog box for setting your personal user settings |
| View | Show Graphical View | Use to display the workflow which a selected activity belongs to |
| | Show Detailed View | Use to display the details of the current activity in a process |
| | Widen Canvas | Use to widen the visible Target Area when the Target Area displays a workflow |
| | Heighten Canvas | Use to heighten the visible Target Area when the Target Area displays a workflow |
| Process | New | Use to create a new process based on the selected template |
| | Properties | Use to view the properties (General, Initiator, User Defined Attributes, and Attachments) of a selected process |
| | History | Displays the history for a process |
| Activity | Properties | Use to view the properties (General, Assignee, User Defined Attributes, Script, and Forms) of a selected activity |
| Template | New | Use to create a new template |
| | Edit | Use to edit an existing template |
| | Save | Use to save a template |
| | Save As | Use to save an existing template under a different name |
| | Properties | Use to view the properties (General, Owner, User defined Attributes, and Script) of a selected template |
| Document | Associations | Use to specify which application to use to open attachments with a given filename extension |
| | Check-in | Use to check-in attachments which have been opened for editing so that others may see the changes and edit them as necessary |
| Help | Help Topics | Use to display online help |

TABLE 2

| | |
|---|---|
|  | Use to create a new process |
|  | Use to toggle to Graphical View |
|  | Use to toggle to Detailed View |
|  | Use to display your User Profile |

TABLE 3

| | |
|---|---|
| ▶ | marks an active process that the user started |
| ⏹ | marks a completed process that the user started |

TABLE 3-continued

| | |
|---|---|
| | marks an active process |
| | marks a completed process |
| | denotes a template |

TABLE 4

| Operator | Symbol | Description | Usage Illustration |
|---|---|---|---|
| Start | (START circle) | Identifies the start of the process. Every process must have one and only one Start node. | START → action |
| Arrow | ↓ (action with arrow) | Defines the flow of events. When an arrow originates from an activity node, it represents a choice which the activity assignee can make in response to the activity. | See the other usage illustrations. NOTE: All arrows have a name field, but this field has been omitted from the usage illustrations. |
| Condition | ◇ | When this node is reached, the process will not condition specified by one of the outgoing arrows of the node is satisfied. Use this type of node to do automated decision-making for you. | if price = $1000  if price = $5000 |
| OR | (OR symbol) | When the first activity preceding and connected to this type of node is completed, all ensuing activities connected to the node are activated simultaneously. Use this type of a node when you want a response to an activity to result in more than one new activity. | |
| AND | ✕ | When this node is reached, the process will not continue until all activities which lead to this node have been completed. Use this node to synchronize activities. | ... → EXIT |

TABLE 4-continued

| Operator | Symbol | Description | Usage Illustration |
|---|---|---|---|
| Exit | EXIT | Identifies the end of the process. Every process must have at least one Exit node. | |

Legend:
■ (green) = current activity,
■ (blue) = completed activity,
■ (aqua) = pending activity

TABLE 5

| Package Name | Description |
|---|---|
| appinterfaces | Contains set of interfaces for updating the dat in the 3 primary UI components and for beginning an editing session |
| (DMS) | Contains interfaces and classes for managing the Document Management System ((DMS)) and the Directory Service (DS). This includes retrieving/updating information on folders and attachments in the (DMS) or on roles and groups in the DS and checking-in/out objects from the (DMS). |
| event | Contains interfaces and classes to listen for when the user creates a new item or selects a different item for which to obtain information |
| form | Contains the applet class used to set and get information from a form. |
| Organizer2 | Contains the interfaces and classes for listening for events in the Organizer UI component and updating the Organizer appropriately. |
| plan | Contains the interfaces and classes for updating all the different aspects of a plan or process model. This includes nodes and arrows, forms and attachments, workitems, and permission levels. |
| planview | Contains the classes used to implement the interfaces in the appinterfaces package. |
| WFManager | Contains the classes used to obtain an initial connection to the Server, retrieve workitem, process, and template lists based on filter criteria, and retrieve processes and templates. |

While there have been described herein what are considered to be preferred and exemplary embodiments of the present invention, other modifications of the invention shall be apparent to those skilled in the art from the teachings herein, and it is, therefore desired to be secured in the appended claims all such modifications and extensions as fall with within the true spirit and scope of the invention. The invention is to be construed as including all embodiments thereof that fall within the scope of the appended claims and the invention should only be limited by the appended claims below. In addition, one skilled in the art will readily appreciate that other applications may be substituted for those set forth herein without departing from the spirit and scope of the present invention.

What is claimed is:

1. A programmed computer system for flexibly changing infrastructure components used for implementing workflow processes, the system comprising:
    a processor;
    a workflow engine executed by a first computer based system for defining and enacting a plurality of different workflow processes, a definition of a first workflow process specifying a first sequence of tasks for realizing a first overall project, and a definition of a second workflow process specifying a second sequence of tasks for realizing a second overall project, the first and second sequence of tasks differing from each other and realizing different overall projects;
    a client executed by a second computer-based system coupled to said workflow engine and transmitting commands for defining the plurality of different workflow processes;
    an infrastructure component configured to provide a service invoked by the workflow engine, the infrastructure component belonging to a particular infrastructure type, wherein a plurality of different infrastructure components belong to the particular infrastructure type; and
    a plurality of adapters associated with the plurality of different infrastructure components belonging to the particular infrastructure type, each of the plurality of adapters configured to provide a communication interface between the workflow engine and a corresponding one of the plurality of different infrastructure components, wherein the workflow engine is configured to identify a particular infrastructure component invoked by the service corresponding to a particular one of the plurality of adapters for the infrastructure component for providing the communication interface during the service, wherein the workflow engine is configured to automatically identify another one of the plurality of adapters corresponding to a new infrastructure component selected from the plurality of different infrastructure components with no code changes to the workflow engine, in response to the infrastructure component being replaced with the new infrastructure component.

2. The programmed computer system of claim 1 wherein said client executes in a web browser.

3. The programmed computer system of claim 1 wherein said workflow engine is implemented using the JAVA programming language.

4. The programmed computer system of claim 1 wherein the particular infrastructure type is a database management system, and the plurality of different infrastructure components are database management systems with different architectures.

5. The programmed computer system of claim 1 wherein the particular infrastructure type is a document management system, and the plurality of different infrastructure components are document management systems with different architectures.

6. The programmed computer system of claim 5 wherein functions of the particular adapter include:

creating a document management service object for a specified user; and destroying a document management service object.

7. The programmed computer system of claim 6 wherein the functions of the particular adapter further include:

returning a list of documents/directories for a specified path;

checking out a specified file for read or write; and checking in the specified file.

8. The programmed computer system of claim 6 wherein the functions of the particular adapter further includes:

returning a path of an attachment directory where files are checked out for read mode; and returning a path of an attachment directory where files are checked out for write mode.

9. The programmed computer system of claim 1 wherein the service is a directory service and the particular adapter provides a communication mechanism between the workflow engine and the directory service.

10. The programmed computer system of claim 9 wherein the functions of the particular adapter include:

creating a directory session object for a specified user; and destroying a directory session object.

11. The programmed computer system of claim 10 wherein the functions of the particular adapter further includes:

returning a list of users for a specified group;

returning the list of users in a specified group as one long string; and returning a list of groups.

12. The programmed computer system of claim 10 wherein the functions of the particular adapter further includes:

creating properties for the specified user;

returning the properties for a specified user;

updating the properties for the specified user; and deleting the properties of the specified user.

13. The programmed computer system of claim 9 further comprising:

a second service invoking a document management system; and a plurality of second adapters providing a communication mechanism between the workflow engine and the document management system.

14. The programmed computer system of claim 13 further comprising a Document Directory adapter for obtaining a document management system object from the document management system and for obtaining a directory object from the directory services, and providing said objects to the workflow engine.

15. The programmed computer system of claim 5 wherein the particular adapter returns all disk drives available on a machine where the document management system is running.

16. The programmed computer system of claim 1 wherein the service is a script interpreter and the particular adapter provides a communication mechanism between the workflow engine and the script interpreter.

17. The programmed computer system of claim 1 wherein the service is an electronic mail system and the particular adapter provides a communication mechanism between the workflow engine and the electronic mail system.

18. The programmed computer system of claim 1 wherein the service is a naming service that allows a client to refer to an object being executed by the first computer based system by referring to a naming service name for the object without the client having to refer to a pointer to the object as it exists on the first computer based system, thereby allowing a client to refer to an object even though an object may be moved to a different location within the first computer based system.

19. The programmed computer system of claim 18 wherein the first computer based system comprises a plurality of connected computers.

20. The programmed computer system of claim 1 wherein an interface between the workflow engine and said client is governed by a Common Object Request Broker Architecture interface.

21. The programmed computer system of claim 1 wherein an interface between the workflow engine and said client is governed by the Internet Inter-ORB Protocol.

22. The programmed computer system of claim 1 wherein an interface between the workflow engine and said adapters is governed by a Common Object Request Broker Architecture interface.

23. The programmed computer system of claim 1 wherein an interface between the workflow engine and said adapters is governed by the Internet Inter-ORB Protocol.

24. The programmed computer system of claim 4 wherein said particular adapter uses the Java DataBase Connectivity standard to provides the communication mechanism between said workflow engine and said database management system.

25. The programmed computer system of claim 1 further comprising:

a web server for enabling said client to communicate with said workflow engine and said adapters.

26. The programmed computer system of claim 14 wherein the Document Directory adapter authenticates users.

27. The programmed computer system of claim 26 wherein the Document Directory adapter performs role resolution.

28. The programmed computer system of claim 1, further comprising a configuration file listing the particular one of the plurality of adapters to be used for the service, wherein the configuration file is modified with a name of the another one of the plurality of adapters in response to a user command.

29. The programmed computer system of claim 2, wherein the client is provided by a web server for access by the second computer over a World Wide Web for defining the plurality of different workflow processes.

30. The programmed computer system of claim 1, wherein the client may be customized by a user by mixing and matching a plurality of different client components.

31. The programmed computer system of claim 1 further comprising:

a software development kit accessible by a user for custom building an adapter corresponding to a third party infrastructure component.

32. A method for flexibly changing infrastructure components used for implementing workflow processes, the method comprising:

receiving by a workflow engine executed by a computer system commands for defining and enacting a plurality of different workflow processes, the definition of a first workflow process specifying a first sequence of tasks for realizing a first overall project, and the definition of a second workflow process specifying a second sequence of tasks for realizing a second overall project;

invoking an infrastructure component for providing a service requested by the workflow process, the infrastructure component belonging to a particular infrastructure type, wherein a plurality of different infrastructure components belong to the particular infrastructure type;

providing a plurality of adapters for the plurality of different infrastructure components belonging to the particular infrastructure type, each of the plurality of adapters configured to provide a communication interface between the workflow engine and a corresponding one of the plurality of different infrastructure components;

identifying by the workflow engine a particular one of the plurality of adapters for providing the communication interface between the workflow engine and the infrastructure component during the service;

replacing the infrastructure component with a new infrastructure component selected from the plurality of different infrastructure components; and automatically identifying by the workflow engine another one of the plurality of adapters corresponding to the new infrastructure component, wherein no code changes are made to the workflow engine in replacing the infrastructure component with the new infrastructure component.

33. The method of claim 32, wherein the particular infrastructure type is a document management system, and the plurality of different infrastructure components are document management systems with different architectures.

34. The method of claim 32, wherein the particular infrastructure type is a directory system, and the plurality of different infrastructure components are directory systems with different architectures.

35. The method of claim 32, wherein the particular infrastructure type is a database management system, and the plurality of different infrastructure components are database management systems with different architectures.

36. The system of claim 1, wherein the different infrastructure components belonging to the particular infrastructure type are interchangeable with each other for providing the service invoked by the workflow engine.

37. The method of claim 32, wherein the different infrastructure components belonging to the particular infrastructure type are interchangeable with each other for providing the service invoked by the workflow engine.

38. A method for flexibly changing infrastructure components used for implementing workflow processes by a workflow engine executed by a computer system, the method comprising:

receiving by the workflow engine commands for defining and enacting a plurality of different workflow processes, the definition of a first workflow process specifying a first sequence of tasks for realizing a first overall project, and the definition of a second workflow process specifying a second sequence of tasks for realizing a second overall project;

invoking a service for implementing a particular one of the plurality of different workflow processes;

identifying an infrastructure component for providing the service, the identified infrastructure component belonging to a particular infrastructure type, wherein a plurality of different infrastructure components belong to the particular infrastructure type;

providing a plurality of adapters for the plurality of different infrastructure components belonging to the particular infrastructure type, wherein each of the plurality of adapters is configured to provide a communication interface between the workflow engine and a corresponding one of the plurality of different infrastructure components, wherein the plurality of adapters are provided even if the corresponding infrastructure components are not provided to the workflow engine;

selecting one of the plurality of adapters based on the identified infrastructure component for providing a communication interface between the workflow engine and the identified infrastructure component during the service;

automatically identifying another one of the plurality of adapters corresponding to a new infrastructure component selected from the plurality of different infrastructure components with no code changes to the workflow engine, in response to the infrastructure component being replaced with the new infrastructure component.

39. The method of claim 38, wherein the particular infrastructure type is a document management system, and the plurality of different infrastructure components are document management systems with different architectures.

40. The method of claim 38, wherein the particular infrastructure type is a directory service system, and the plurality of different infrastructure components are directory service systems with different architectures.

41. The method of claim 38, wherein the particular infrastructure type is a database system, and the plurality of different infrastructure components are database systems with different architectures.

42. The method of claim 38, further comprising:

selecting one of the different infrastructure components not already provided to the workflow engine;

replacing the identified infrastructure component with the selected one of the different infrastructure components; and identifying one of the plurality of adapters for the selected one of the different infrastructure components for providing a communication interface between the workflow engine and the selected one of the different infrastructure components.

43. The method of claim 42, wherein no code changes are made to the workflow engine in response to replacing the identified infrastructure component with the selected one of the different infrastructure components.

* * * * *